US012787092B2

(12) United States Patent
Miklós et al.

(10) Patent No.: US 12,787,092 B2
(45) Date of Patent: Nov. 3, 2026

(54) USER PLANE REDUNDANCY BETWEEN USER EQUIPMENT AND USER PLANE FUNCTION

(71) Applicant: Telefonaktiebolaget LM Ericsson (publ), Stockholm (SE)

(72) Inventors: György Miklós, Pilisborosjenö (HU); Balázs Varga, Budapest (HU); János Farkas, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 18/691,714

(22) PCT Filed: Sep. 15, 2022

(86) PCT No.: PCT/IB2022/058724

§ 371 (c)(1),
(2) Date: Mar. 13, 2024

(87) PCT Pub. No.: WO2023/042124

PCT Pub. Date: Mar. 23, 2023

(65) Prior Publication Data

US 2024/0414792 A1 Dec. 12, 2024

Related U.S. Application Data

(60) Provisional application No. 63/244,472, filed on Sep. 15, 2021.

(51) Int. Cl.
*H04W 76/15* (2018.01)
*H04W 76/11* (2018.01)

(52) U.S. Cl.
CPC ............ *H04W 76/15* (2018.02); *H04W 76/11* (2018.02)

(58) Field of Classification Search
CPC ....... H04W 76/15; H04W 76/11; H04L 45/24; H04L 47/2416; H04L 1/08
See application file for complete search history.

(56) References Cited

U.S. PATENT DOCUMENTS

2020/0107213 A1 4/2020 Park et al.
2021/0211233 A1 * 7/2021 Zhang ........................ H04L 1/08
(Continued)

FOREIGN PATENT DOCUMENTS

EP 3 732 928 B1 4/2022
WO 2019/130048 A1 7/2019
(Continued)

OTHER PUBLICATIONS

International Search Report and Written Opinion dated Dec. 16, 2022 issued in PCT Application PCT/IB2022/058724, consisting of 17 pages.
(Continued)

*Primary Examiner* — Abdullahi Ahmed
(74) *Attorney, Agent, or Firm* — Sonoda & Kobayashi Intellectual Property Law; Sarvajit S. Patil

(57) ABSTRACT

A user equipment (UE) configured to communicate with at least a network node is described. The UE comprises a radio interface and processing circuitry in communication with the processing circuitry. The radio interface is configured to receive, from the network node, an indication indicating the UE to establish a first protocol data unit (PDU) session and a second PDU session that support one or more packet replication and redundant transmissions between the UE and a same UPF network node. The same UPF network node is selected by the network node based on one or more parameters. The processing circuitry is configured to establish, based on the received indication, the first and second PDU sessions that support the one or more packet replication and redundant transmissions between the UE and the same UPF network node.

20 Claims, 10 Drawing Sheets

(56) References Cited

U.S. PATENT DOCUMENTS

| | | | | |
|---|---|---|---|---|
| 2022/0417771 | A1* | 12/2022 | Shimoda | H04W 36/087 |
| 2023/0318746 | A1* | 10/2023 | Kim | H04L 1/08<br>370/235 |
| 2024/0251462 | A1* | 7/2024 | Dou | H04W 76/14 |
| 2024/0381187 | A1* | 11/2024 | Lu | H04W 36/144 |

FOREIGN PATENT DOCUMENTS

| | | | |
|---|---|---|---|
| WO | 2020/249201 | A1 | 12/2020 |
| WO | 2023/037340 | A1 | 3/2023 |

OTHER PUBLICATIONS

3GPP TS 23.501 V17.1.1 (Jun. 2021) 3rd Generation Partnership Project; System architecture for the 5G System (5GS); Stage 2 (Release 17), consisting of 526 pages.

3GPP TS 23.502 V16.1.0 (Jun. 2019) 3rd Generation Partnership Project; Technical Specification Group Services and System Aspects; Procedures for the 5G System; Stage 2 (Release 16), consisting of 500 pages.

3GPP TS 38.300 V16.6.0 (Jun. 2021) 3rd Generation Partnership Project; Technical Specification Group Radio Access Network; NR; NR and NG-RAN Overall Description; Stage 2 (Release 16), consisting of 152 pages.

* cited by examiner

USER PLANE REDUNDANCY BETWEEN USER EQUIPMENT AND USER PLANE FUNCTION

CROSS-REFERENCE TO RELATED APPLICATIONS

This Application is a Submission Under 35 U.S.C. § 371 for U.S. National Stage Patent Application of International Application No.: PCT/IB2022/058724, filed Sep. 15, 2022 entitled "USER PLANE REDUNDANCY BETWEEN USER EQUIPMENT AND USER PLANE FUNCTION," which claims priority to U.S. Provisional Application No. 63/244,472, filed Sep. 15, 2021, entitled "USER PLANE REDUNDANCY BETWEEN UE AND UPF," the entireties of both of which are incorporated herein by reference.

TECHNICAL FIELD

The present disclosure relates to wireless communications, and in particular, to user plane redundancy.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile user equipment (UEs, also called wireless devices and WDs), as well as communication between network nodes and between UEs.

The 3GPP network provides some mechanisms for redundant transmission of certain traffic flows (e.g., ultra-reliable low latency communication/URLLC) within the 3GPP system. By redundant traffic handling, two (or more) copies of the data packets may be sent and delivered through separate paths, where the paths may be disjoint to the maximum extent possible at the given deployment. At the receiving side, the duplicate data packets may be eliminated, and only a single copy may be delivered further. The redundant traffic handling allows hiding the effect of any error on one transmission path without any additional delay. Hence, the use of redundancy mechanisms can significantly increase the availability of the communication system. In certain cases, the 3GPP network may provide the full redundancy solution, while in other cases the 3GPP network may provide some of the mechanisms for redundancy which are used in combination with other mechanisms defined by other industry or standardization fora, e.g., so that in combination they provide the full solution.

In one example, redundant transmission over the air interface between the UE and network node may be performed, using the packet data convergence protocol (PDCP) duplication (3GPP Technical Specification (TS) 38.300 section 16.1.3) within the radio access network (RAN) to send the same packet over multiple data bearers. Using PDCP duplication, it is possible to send duplicate copies of the same packet via different network nodes (e.g., RAN network nodes) using dual connectivity (DC), e.g., so that the receiving PDCP entity eliminates the duplicate copies. The use of PDCP duplication can be configured into the RAN and can be used based on 5G Quality-of-service identifier (5QI) values. The Quality-of-service flow identifier (QFI) carried in the packet header may determine the 5QI of the given packet flow. However, in this example is only intended for an over the air interface between the UE and RAN network node.

In another example, a redundant transmission on N3/N9 interfaces may be performed. Support for redundant transmission on the N3/N9 interfaces may be defined, for example, as in 3GPP TS 23.501 section 5.33.2.2. The mechanism allows a session management function (SMF) to configure two redundant general packet radio service (GPRS) tunnelling protocol (GTP) tunnels between the RAN network node and the protocol data unit (PDU) session anchor (PSA) user plane function (UPF). The packets are duplicated and sent with the same GTP user plane (GTP-U) sequence number, which may be used by the receiving side to eliminate the duplicated transmissions. The use of the redundant transmission can be applied on a per flow basis based on the SMF configuration. Redundant data transmission on the N3/N9 is also possible using redundancy mechanisms in the transport layer, for example, as described in 3GPP TS 23.501 section 5.33.2.3. In this case, the redundancy mechanism may be used in the transport layer to duplicate packets and eliminate the duplicate copies in the receiving side, e.g., so that no new 3GPP mechanism is used for the duplication. However, this other example is only intended for the N3/N9 interfaces between the RAN network node and PSA UPF.

In one example, dual connectivity including end-to-end redundant user plane paths may be performed, e.g., to support end-to-end redundant transmission using dual connectivity such as defined in 3GPP TS 23.501 section 5.33.2.1. The terminals (e.g., UEs) may establish two redundant PDU sessions and use upper layer protocols to send the same traffic over the two PDU sessions. There may be 2 RAN nodes and 2 UPFs. One PDU session may be provided by a first RAN node and a first UPF, and the other PDU session may be provided by a second different RAN node and a second different UPF, thereby utilizing dual connectivity to support redundant transmission. However, this example may require dual connectivity using two different RAN network nodes and two different UPFs.

In another example, more than one UE may be used, e.g., as described in 3GPP TS 23.501, Annex F. More specifically, multiple UEs may be included per device, each UE connecting to the 3GPP network, such that the path over the 3GPP network is redundant. That is, this is applicable for devices which are equipped with multiple UEs, and where the network supports this deployment. As with the existing dual connectivity based approach described above, this example uses two different RAN nodes and two different UPFs, i.e., each UE in the device is connected to a different RAN network node and different core network nodes. Thus, redundant transmission is achieved by using two different user plane paths.

In sum, existing technologies require complex configurations and/or use of multiple network nodes, such as more than one UPF.

SUMMARY

Some embodiments advantageously provide methods, systems, and apparatuses for user plane redundancy.

In one embodiment, a network node is configured to optionally, obtain information about communication supporting one or more of packet replication and redundant transmission over a network for a traffic associated with a user equipment (UE); and establish at least one of a first protocol data unit (PDU) session and a second PDU session that supports the one or more of the packet replication and the redundant transmission between the UE and a same user plane function (UPF) network node.

In one embodiment, a user equipment (UE) is configured to optionally, obtain information about communication supporting one or more of packet replication and redundant transmission for a traffic; and establish a first protocol data unit (PDU) session and a second PDU session that supports the one or more of the packet replication and the redundant transmission between the UE and a same user plane function (UPF) network node.

In one embodiment, a network node is configured to optionally, obtain information about communication supporting one or more of packet replication and redundant transmission over a network for a traffic associated with the UE; and establish at least one of a first protocol data unit (PDU) session and a second PDU session that supports the one or more of the packet replication and the redundant transmission between the UE and a same user plane function (UPF), the same UPF being comprised in the network node.

According to one aspect, a user equipment (UE) configured to communicate with at least a network node is described. The UE comprises a radio interface and processing circuitry in communication with the processing circuitry. The radio interface is configured to receive, from the network node, an indication indicating the UE to establish a first protocol data unit (PDU) session and a second PDU session that support one or more packet replication and redundant transmissions between the UE and a same UPF network node. The same UPF network node is selected by the network node based on one or more parameters. The processing circuitry is configured to establish, based on the received indication, the first and second PDU sessions that support the one or more packet replication and redundant transmissions between the UE and the same UPF network node.

In some embodiments, the one or more parameters includes at least one of information about communication supporting the one or more packet replication and redundant transmissions over a network for a traffic associated with the UE; a data network name (DNN); a single-network slice selection assistance information (S-NSSAI); and a first identifier of the UE.

In some other embodiments, the received indication further triggers one or more of the processing circuitry to replicate of a first redundant packet for the first PDU session to produce a second redundant packet for the second PDU session; eliminate of one of a first redundant packet on the first PDU session and a second redundant packet on the second PDU session that is received from the same UPF network node; and the radio interface to perform one or more redundant transmissions between the UE and the same UPF network node.

In an embodiment, the radio interface is further configured to transmit, to the network node, an acknowledgement indicating at least one of the indication has been successfully received and whether a replication and elimination function has been set up.

In another embodiment, when the same UPF network node is selected for the first PDU session, information about the same UPF being selected for the first PDU session is used for a selection of the same UPF network node for the second PDU session.

In some embodiments, the information about the same UPF being selected includes a second identifier of the first and second PDU sessions.

In some other embodiments, whether the same UPF has already been selected for the first and second PDU sessions is based at least in part on the second identifier. The same UPF network node being selected is based on whether the same UPF has already been selected.

In an embodiment, the second identifier includes at least a pair identifier associated with the first and second PDU sessions and a UE identifier mapped to the pair identifier.

In another embodiment, the second identifier is included in the one or more parameters.

In some embodiments, the UE is a dual UE device comprising a first UE and a second UE. The first PDU session supports one or more packet replication and redundant transmissions between the first UE and the same UPF network node. The second PDU session supports the one or more packet replication and redundant transmissions between the second UE and the same UPF network node.

In an embodiment, the radio interface is further configured to transmit capability information indicating a UE capability to support the one or more packet replication and redundant transmissions between the UE and the same UPF network node.

In another embodiment, the network node comprises one of more of a session management functions (SMFs) and a time sensitive communication and time synchronization function (TSCTSF).

According to another aspect, a method in a user equipment (UE) configured to communicate with at least a network node is described. The method comprises receiving, from the network node, an indication indicating the UE to establish a first protocol data unit, PDU, session and a second PDU session that support one or more packet replication and redundant transmissions between the UE and a same UPF network node. The same UPF network node is selected by the network node based on one or more parameters. The method further includes establishing, based on the received indication, the first and second PDU sessions that support the one or more packet replication and redundant transmissions between the UE and the same UPF network node.

In some embodiments, the one or more parameters includes at least one of information about communication supporting the one or more packet replication and redundant transmissions over a network for a traffic associated with the UE; a data network name (DNN); a single-network slice selection assistance information (S-NSSAI); and a first identifier of the UE.

In some other embodiments, based on the received indication, the method further includes one or more of replicating of a first redundant packet for the first PDU session to produce a second redundant packet for the second PDU session; eliminating of one of a first redundant packet on the first PDU session and a second redundant packet on the second PDU session that is received from the same UPF network node; and performing one or more redundant transmissions between the UE and the same UPF network node.

In an embodiment, the method further includes transmitting, to the network node, an acknowledgement indicating at least one of the indication has been successfully received and whether a replication and elimination function has been set up.

In another embodiment, wherein, when the same UPF network node is selected for the first PDU session. Information about the same UPF being selected for the first PDU session is used for a selection of the same UPF network node for the second PDU session.

In some embodiments, the information about the same UPF being selected includes a second identifier of the first and second PDU sessions.

In some other embodiments, whether the same UPF has already been selected for the first and second PDU sessions is based at least in part on the second identifier. The same UPF network node is selected based on whether the same UPF has already been selected.

In an embodiment, the second identifier includes at least a pair identifier associated with the first and second PDU sessions and a UE identifier mapped to the pair identifier.

In another embodiment, the second identifier is included in the one or more parameters.

In some embodiments, the UE is a dual UE device comprising a first UE and a second UE. The first PDU session supports one or more packet replication and redundant transmissions between the first UE and the same UPF network node. The second PDU session supports the one or more packet replication and redundant transmissions between the second UE and the same UPF network node.

In an embodiment, the method further includes transmitting capability information indicating a UE capability to support the one or more packet replication and redundant transmissions between the UE and the same UPF network node.

In another embodiment, the network node comprises one of more of a session management function (SMF); and a time sensitive communication and time synchronization function (TSCTSF).

According to one aspect, a network node configured to communicate with a user equipment (UE) is described. The network node comprises a radio interface and processing circuitry in communication with the processing circuitry. The processing circuitry is configured to select a same user plane function (UPF) network node for a first protocol data unit (PDU) session and a second PDU session that support one or more packet replication and redundant transmissions between the UE and the same UPF network node. The same UPF network node is selected based on one or more parameters. The radio interface is configured to transmit an indication to at least one of the UE and the same UPF network node. The transmitted indication indicates at least one of the UE and the same UPF network node to establish the first and second PDU sessions using the selected same UPF network node.

In some embodiments, the one or more parameters includes at least one of information about communication supporting the one or more packet replication and redundant transmissions over a network for a traffic associated with the UE; a data network name (DNN); a single-network slice selection assistance information (S-NSSAI); and a first identifier of the UE.

In some other embodiments, the transmitted indication further triggers the at least one of the UE and the same UPF to one or more of replicate of a first redundant packet for the first PDU session to produce a second redundant packet for the second PDU session; eliminate of one of a first redundant packet on the first PDU session and a second redundant packet on the second PDU session that is received from the same UPF network node; and perform one or more redundant transmissions between the UE and the same UPF network node.

In an embodiment, the radio interface is further configured to receive an acknowledgement from at least one of the UE and the same UPF indicating at least one of the indication has been successfully received and whether a replication and elimination function has been set up.

In another embodiment, the network node further includes a memory, and the processing circuitry configured to select the same UPF network node for the first PDU session and the second PDU session is further configured to when the same UPF network node is selected for the first PDU session: store in the memory information about the same UPF being selected for the first PDU session; retrieve from the memory the information for a selection of the same UPF network node for the second PDU session.

In some embodiments, the processing circuitry is further configured to store in the memory the information about the same UPF being selected and a second identifier of the first and second PDU sessions.

In an embodiment, the processing circuitry is further configured to determine whether the same UPF has already been selected for the first and second PDU sessions based at least in part on the second identifier. The selection of the same UPF network node is based on whether the same UPF has already been selected.

In another embodiment, the second identifier includes at least a pair identifier associated with the first and second PDU sessions and a UE identifier mapped to the pair identifier.

In some embodiments, the second identifier is included in the one or more parameters.

In some other embodiments, the UE is a dual UE device comprising a first UE and a second UE. The first PDU session supports one or more packet replication and redundant transmissions between the first UE and the same UPF network node. The second PDU session supports the one or more packet replication and redundant transmissions between the second UE and the same UPF network node.

In another embodiment, the radio interface is further configured to receive capability information indicating one of a UE capability and a UPF capability to support the one or more packet replication and redundant transmissions between the UE and the same UPF network node.

In some embodiments, the network node comprises one of more of a session management function (SMF) and a time sensitive communication and time synchronization function (TSCTSF).

According to another aspect, a method in a network node configured to communicate with a user equipment (UE) is described. The method comprises selecting a same user plane function (UPF) network node for a first protocol data unit (PDU) session and a second PDU session that support one or more packet replication and redundant transmissions between the UE and the same UPF network node. The same UPF network node is selected based on one or more parameters. The method further includes transmitting an indication to at least one of the UE and the same UPF network node. The transmitted indication indicates at least one of the UE and the same UPF network node to establish the first and second PDU sessions using the selected same UPF network node.

In some embodiments, the one or more parameters includes at least one of information about communication supporting the one or more packet replication and redundant transmissions over a network for a traffic associated with the UE; a data network name (DNN); a single-network slice selection assistance information (S-NSSAI); and a first identifier of the UE.

In some other embodiments, the transmitted indication further triggers the at least one of the UE and the same UPF to one or more of replicate of a first redundant packet for the first PDU session to produce a second redundant packet for the second PDU session; eliminate of one of a first redundant packet on the first PDU session and a second redundant packet on the second PDU session that is received from the same UPF network node; and perform one or more redundant transmissions between the UE and the same UPF network node.

In another embodiment, the method further includes receiving an acknowledgement from at least one of the UE and the same UPF indicating at least one of the indication has been successfully received and whether a replication and elimination function has been set up.

In another embodiment, the selection of the same UPF network node for the first PDU session and the second PDU session further includes, when the same UPF network node is selected for the first PDU session: storing information about the same UPF being selected for the first PDU session; retrieving the information for a selection of the same UPF network node for the second PDU session.

In some embodiments, the method further includes storing the information about the same UPF being selected and a second identifier of the first and second PDU sessions.

In some other embodiments, the method further includes determining whether the same UPF has already been selected for the first and second PDU sessions based at least in part on the second identifier. The selection of the same UPF network node is based on whether the same UPF has already been selected.

In an embodiment, the second identifier includes at least a pair identifier associated with the first and second PDU sessions and a UE identifier mapped to the pair identifier.

In another embodiment, the second identifier is included in the one or more parameters.

In some embodiments, the UE is a dual UE device comprising a first UE and a second UE. The first PDU session supports one or more packet replication and redundant transmissions between the first UE and the same UPF network node. The second PDU session supports the one or more packet replication and redundant transmissions between the second UE and the same UPF network node.

In an embodiment, the method further includes receiving capability information indicating one of a UE capability and a UPF capability to support the one or more packet replication and redundant transmissions between the UE and the same UPF network node.

In another embodiment, the network node comprises one of more of a session management function (SMF) and a time sensitive communication and time synchronization function (TSCTSF).

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
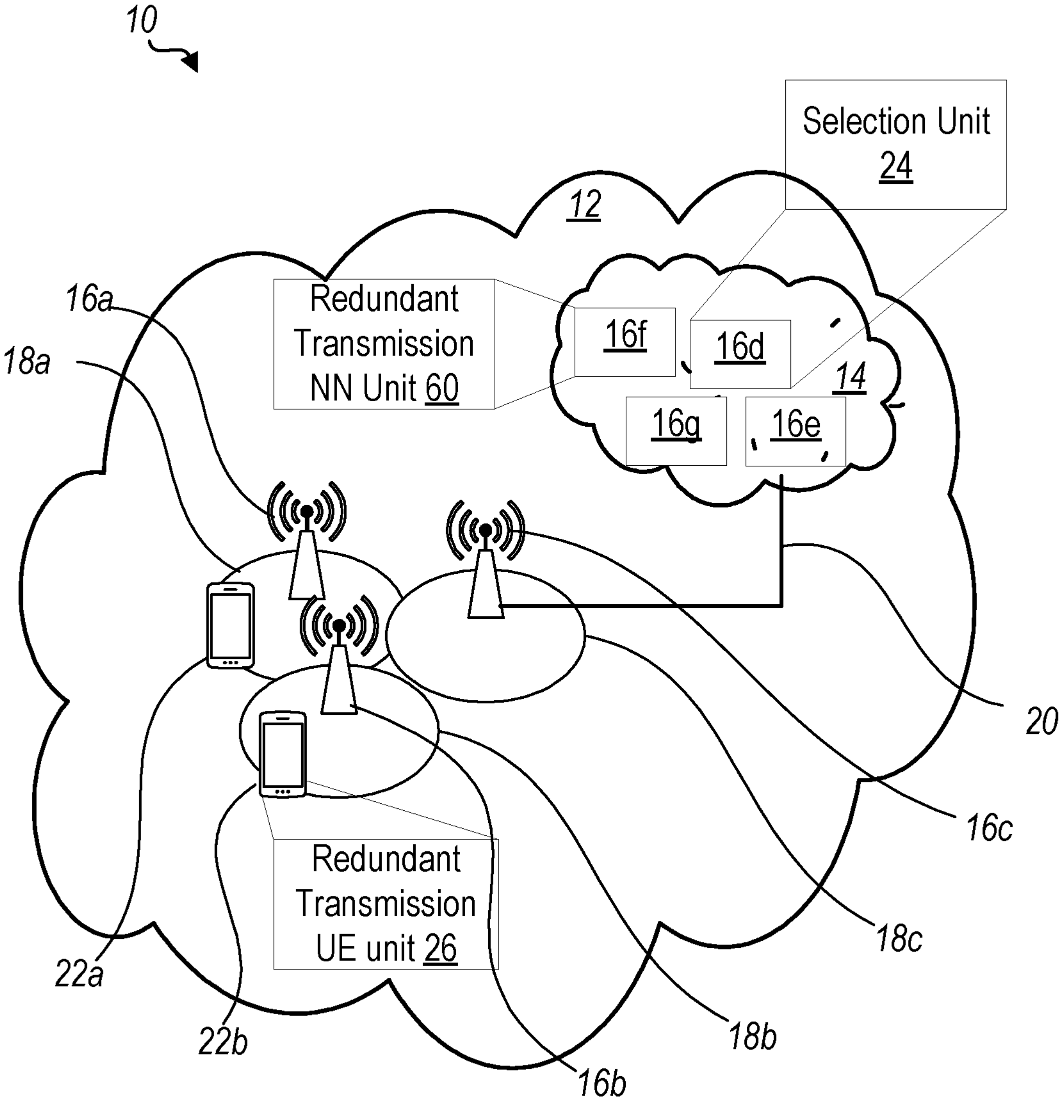
FIG. 1 is a schematic diagram of an example network architecture illustrating a communication system according to principles disclosed herein.

The existing mechanisms for redundant transmissions address different scenarios. For example, PDCP duplication applies redundancy to the air interface only (e.g., RAN only), and not applicable for the rest of the end to end user plane path.

Also, N3/N9 duplication applies redundancy over the N3/N9 interface only, and not applicable for the rest of the end to end user plane path. The case is the same with transport network based redundancy on N3/N9.

In addition, for the dual connectivity based end-to-end redundancy and for the multiple UEs within a single device approach described above, the existing 3GPP solution provides a way to establish two PDU sessions that have different paths (i.e., different RAN network nodes and different UPFs).

The existing approaches may be combined to provide an end-to-end redundancy solution as separate components, but the actual replication and elimination of the packets takes place outside the 3GPP network, defined by other mechanisms such as Institute of Electrical and Electronics Engineers (IEEE) time sensitive networking (TSN) Frame Replication and Elimination for Reliability (FRER). This may require extra effort and cost to deploy such solutions due to the dependency to set up the redundancy by entities that are external to the 3GPP operator.

In one or more embodiments of the present disclosure, a process (e.g., a 3GPP mechanism) is described, where the process provides redundancy over the network (e.g., a 3GPP network) without requiring the network operator (e.g., the 3GPP operator) to rely on external nodes and mechanisms. Yet, the process may include one or more actions (and/or features) to cover the full 3GPP network.

Some embodiments of the present disclosure describe arrangements to have a 3GPP mechanism to set up redundant packet transmissions between a UE (e.g., comprised in a terminal device) and a UPF using two separate PDU sessions. The replication and elimination functions may take place at the UE (e.g., comprised in the terminal device) as well as the UPF. The same UPF may be selected for both of the PDU sessions. One or more network node (e.g., 3GPP entity, such as the SMF) may indicate to both the UE (e.g., comprised in the terminal device) and to the same UPF to apply replication and elimination for a specific set of traffic, which may be defined using one or more parameters/criteria such as a filtering criteria, other criteria, other parameters. In some embodiments, the actual replication and elimination protocol can re-use a predefined protocol such as IEEE or Internet Engineering Task Force (IETF). The protocol to use may be indicated to the UE (e.g., comprised in the terminal device) and the UPF.

Some embodiments of the present disclosure provide arrangements where, in the case of two (or more) redundant PDU sessions, the same network node (e.g., the same UPF) is selected for the second PDU session as for the first PDU session. The UE (e.g., comprised in the terminal device) and the UPF may receive an indication from a network node (e.g., a 3GPP network entity/node) to switch on (e.g., enable, activate, use, etc.) the replication and elimination functions for a particular set of traffic flows.

Some embodiments may advantageously provide one or more of the following:

- Provide redundancy between the UE (e.g., comprised in the terminal device) and UPF, thereby protecting against network node or link failures between them.
- Allow 3GPP operators to be in control of the redundancy mechanism without having to rely on external entities to set up the redundancy.
- The redundancy that spans between the UE (e.g., comprised in the terminal device) and the UPF is higher compared to using independent redundancy mechanisms on the air interface and on the transport layer between RAN and UPF, as the latter may have a single point of failure (RAN network node). It is noted that, when using dual connectivity, there are two RAN nodes in the user plane. When using redundancy over the air interface, there may be a single RAN node in the user plane.

Before describing in detail exemplary embodiments, it is noted that the embodiments reside primarily in combinations of apparatus components and processing steps related to user plane redundancy. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term “radio node” used herein may be used to also denote a wireless device such as a UE or a radio network node.

The network node can be a network node in any core network, such as a Fifth Generation (5G) and/or New Radio (NR) core network node, an Evolved Packet System (EPS) core network node, etc. The network node can be any core network node such as a mobility management network node (e.g., Mobility Management Entity (MME) and/or Access and Mobility Function (AMF)), a gateway network node (e.g., access gateway), a session management network node (e.g., session management function (SMF) network node), a user plane function (UPF) network node, a subscriber database network node (e.g., unified data repository (UDR), home subscriber server (HSS)) network node, a home location register (HLR) network node, a network repository function (NRF) network node, a unified data management (UDM) network node, a Network Exposure Function (NEF) network node, a data network (DN) network node, an authentication server function (AUSF) network node, a network slice selection function (NSSF) network node, a policy control function (PCF) network node and an application function (AF) network node, a time sensitive communication and time synchronization function (TSCTSF).

The network node can be any Internet Protocol (IP) Multimedia Subsystem (IMS) network node, such as, for example, a Proxy-Call Session Control Function (P-CSCF) network node, a Serving-CSCF (S-CSCF) network node, an Interrogating-CSCF (I-CSCF) network node, etc.

In some embodiments, one or more of the network nodes described herein may be more generally considered and/or comprise a network function (NF) and may be referred to as a NF network node and/or NF.

In some embodiments, a Third Generation Partnership Project (3GPP) core network (e.g., 5GC) may include a Service Based Architecture (SBA) in which Network Functions (NFs) provide one or more services to one or more service consumers. This can be performed, for example, via Hyper Text Transfer Protocol/Representational State Transfer (HTTP/REST), application programming interfaces (APIs), etc. Generally, the various services may be considered self-contained functionalities that can be changed and modified in an isolated manner without affecting other services. Furthermore, the services may include various service operations, which may be more granular divisions of the overall service functionality. In some embodiments, in order to access a service, both the service name and the targeted service operation is to be indicated. The interactions between service consumers and service producers may be, for example, a "request/response" or "subscribe/notify" type or yet other types of interactions. In some embodiments, a network repository function (NRF) may allow NFs to discover the services offered by other NFs, and Data Storage Functions (DSFs) may allow NFs to store its context. In some embodiments, the 5GC SBA model may provide e.g., modularity, reusability and/or self-containment of NFs, which may be compatible with virtualization technologies.

In some embodiments, one or more of the nodes described herein may be more generally considered and/or comprise an application function (AF) and may be referred to as an AF network node and/or AF.

In some embodiments, an AF may interact with a 3GPP core network (e.g., 5GC) to provide one or more of services. Based on operator deployment, an AF may be trusted by the operator to interact directly with relevant network functions (NFs). AFs not permitted by the operator to access directly the NFs may use, for example, an external exposure framework (e.g., via a network exposure function (NEF)) to interact with relevant NFs. In some embodiments, the AF may provide one or more services to a user/UE, in which, for example, a packet-based service data flow is provided to the user/UE, e.g., the streaming of video and/or audio data packets from a content provider to a subscriber of a mobile communications network. The AF may for example be attached to or part of the 3GPP Policy and Charging (PCC) architecture and may be specified in one or more particular 3GPP Technical Specifications. IMS nodes, such as P-CSCF, S-CSCF, I-CSCF, etc. may be considered types of NF nodes.

In some embodiments, the various AF network nodes and NF network nodes that may be described herein may be referred to by their function names and/or more generally as network nodes.

Any node described herein, such as network node, may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node may be said to be virtualized. A node may be associated with multiple physical components that may be located either in one location, or may be distributed across multiple locations.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc. In one or more embodiments, the UE may be comprised in a terminal device. A terminal device may refer to any device configurable to include one or more UEs, e.g., a first UE, a second UE, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, the term "obtain" or "obtaining" is used herein and may indicate obtaining in e.g., memory such as in the case where the information is predefined. The term "obtain" or "obtaining" as used herein may also indicate obtaining by receiving signaling indicating the information obtained.

In some embodiments, a "set" as used herein may be a set of 2 or more elements in the set.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter, and the receiver is the UE. For the UL communication, the transmitter is the UE, and the receiver is the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., information, parameters, tables, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data.

Configuring a Radio Node

Configuring a radio node, in particular a terminal or user equipment or the UE, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the UE). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node.

Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., UE) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g., UE) may comprise configuring the UE to perform certain measurements on certain subframes or radio resources and reporting such measurements according to embodiments of the present disclosure.

In some embodiments, the term communication direction is intended to indicate an UL communication direct (i.e., communications from the UE to the network node) and/or a DL communication direction (i.e., communications in a direction from the network node to the UE).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or a network node may be distributed over a plurality of UEs and/or network nodes. In other words, it is contemplated that the functions of the network node and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to arrangements for user plane redundancy. Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A UE 22*a* located in coverage area 18*a* is configured to wirelessly connect to, or be paged by, the corresponding network node 16*a*. A second UE 22*b* in coverage area 18*b* is wirelessly connectable to the corresponding network node 16*b*. While a plurality of UEs 22*a*, 22*b* (collectively referred to as UEs 22) are illustrated in this example, the disclosed embodiments are equally applicable to a situation where a sole UE is in the coverage area or where a sole UE is connecting to the corresponding network node 16. The communication system 10 may further include other network nodes 16*d*, 16*e*, 16*f*, 16*g* in the core network 14. Note that although only two UEs 22 and seven network nodes 16 are shown for ease of understanding, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

A network node 16*d* (e.g., SMF, TSCTSF, etc.) may be configured to include a selection unit 24 which is configured to perform any step and/or task and/or process and/or method and/or feature described in the present disclosure, e.g., optionally, obtain information about communication supporting one or more of packet replication and redundant transmission over a network for a traffic associated with the UE; and/or establish (or trigger the UE 22 or another network node 16 to establish) at least one of a first protocol data unit (PDU) session and a second PDU session that supports the one or more of the packet replication and the redundant transmission between the UE and a same user plane function (UPF) network node. Network node 16*e* may be configured similar to network node 16*d*.

A network node 16*f* (e.g., UPF) may be configured to include a redundant transmission (RT) network node (NN) unit 24 which is configured to perform any step and/or task and/or process and/or method and/or feature described in the present disclosure, e.g., establish a first protocol data unit (PDU) session and a second PDU session that supports the one or more of the packet replication and the redundant transmission between the UE 22 and a same user plane function (UPF) network node.

A UE 22 is configured to include a RT UE unit 26 which is configured to perform any step and/or task and/or process and/or method and/or feature described in the present disclosure, e.g., optionally, obtain information about communication supporting one or more of packet replication and redundant transmission for a traffic; and/or establish a first protocol data unit (PDU) session and a second PDU session that supports the one or more of the packet replication and the redundant transmission between the UE and a same user plane function (UPF) network node.

Example implementations, in accordance with an embodiment, of the UE 22 and network node 16 discussed in the preceding paragraphs will now be described with reference to FIG. 2.

The communication system 10 includes a network node 16 provided in a communication system 10 and including hardware 28 enabling it to communicate with the UE 22. The hardware 28 may include a radio interface 30 for setting up and maintaining at least a wireless connection 32 with a UE 22 located in a coverage area 18 served by the network node 16 (such as network node 16*a* and/or any other network node 16). The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes network node 16*d* (and/or network node 16*e* and/or any other network node 16) which may include the same software 42 and hardware 28 elements described above as included in network node 16 (not shown). Network node 16*d* (and/or network node 16*e* and/or any other network node 16) may refer to an SMF, Time Sensitive Communication and Time Synchronization function/TSCTSF network node, etc. Processing circuitry 36 of the network node 16 may include selection unit 24 which is configured to perform any step and/or task and/or process and/or method and/or feature described in the present disclosure, e.g., optionally, obtain information about communication supporting one or more of packet replication and redundant transmission over a network for a traffic associated with the UE; and/or establish at least one of a first protocol data unit (PDU) session and a second PDU session that supports the one or more of the packet replication and the redundant transmission between the UE and a same user plane function (UPF) network node.

The communication system 10 further includes network node 16*f* (and/or network node 16*g* and/or any other network node 16), such as a UPF, which may include the same software 42 and hardware 28 elements described above as included in network node 16 (not shown). Processing circuitry 36 of the network node 16*f* (and/or network node 16*g*) may include RT NN unit 60 which is configured to perform any step and/or task and/or process and/or method and/or feature described in the present disclosure, e.g., optionally, obtain information about communication supporting one or more of packet replication and redundant transmission over a network for a traffic associated with the UE; and establish at least one of a first protocol data unit (PDU) session and a second PDU session that supports the one or more of the packet replication and the redundant transmission between the UE and a same user plane function (UPF), the same UPF being comprised in the network node.

The communication system 10 further includes the UE 22 already referred to. The UE 22 may have hardware 44 that may include a radio interface 46 configured to set up and maintain a wireless connection 32 with a network node 16 (e.g., a RAN network node 16*a*) serving a coverage area 18 in which the UE 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the UE 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 56, which is stored in, for example, memory 54 at the UE 22, or stored in external memory (e.g., database, storage array, network storage device, etc.) accessible by the UE 22. The software 56 may be executable by the processing circuitry 50. The software 56 may include a client application 58. The client application 58 may be operable to provide a service to a human or non-human user via the UE 22.

The processing circuitry 50 may be configured to control any of the methods and/or processes described herein and/or to cause such methods, and/or processes to be performed, e.g., by UE 22. The processor 52 corresponds to one or more processors 52 for performing UE 22 functions described herein. The UE 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to UE 22. For example, the processing circuitry 50 of the UE 22 may include RT UE unit 26 which is configured to perform any step and/or task and/or process and/or method and/or feature described in the present disclosure, e.g., optionally, obtain information about communication supporting one or more of packet replication and redundant transmission for a traffic; and establish a first protocol data unit (PDU) session and a second PDU session that supports the one or more of the packet replication and the redundant transmission between the UE and a same user plane function (UPF) network node.

Figure 2:
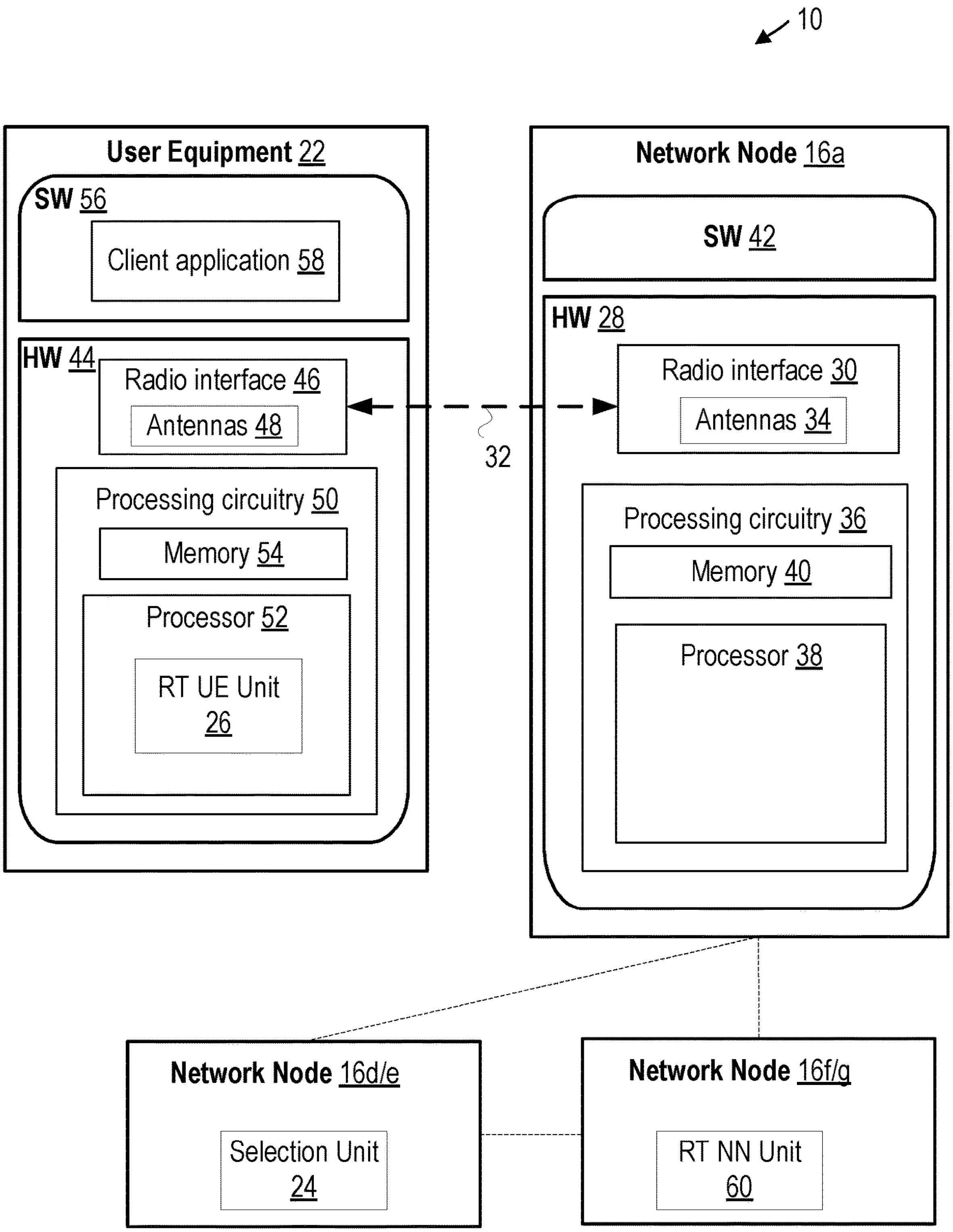
FIG. 2 is a block diagram of a network node in communication with a wireless device over a wireless connection according to some embodiments of the present disclosure.

In some embodiments, the inner workings of the network node 16 and UE 22 may be as shown in FIG. 2 and independently, the surrounding network topology may be that of FIG. 1.

The wireless connection 32 between the UE 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as selection unit 24, RT UE unit 26, and RT network node (NN) unit 60 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
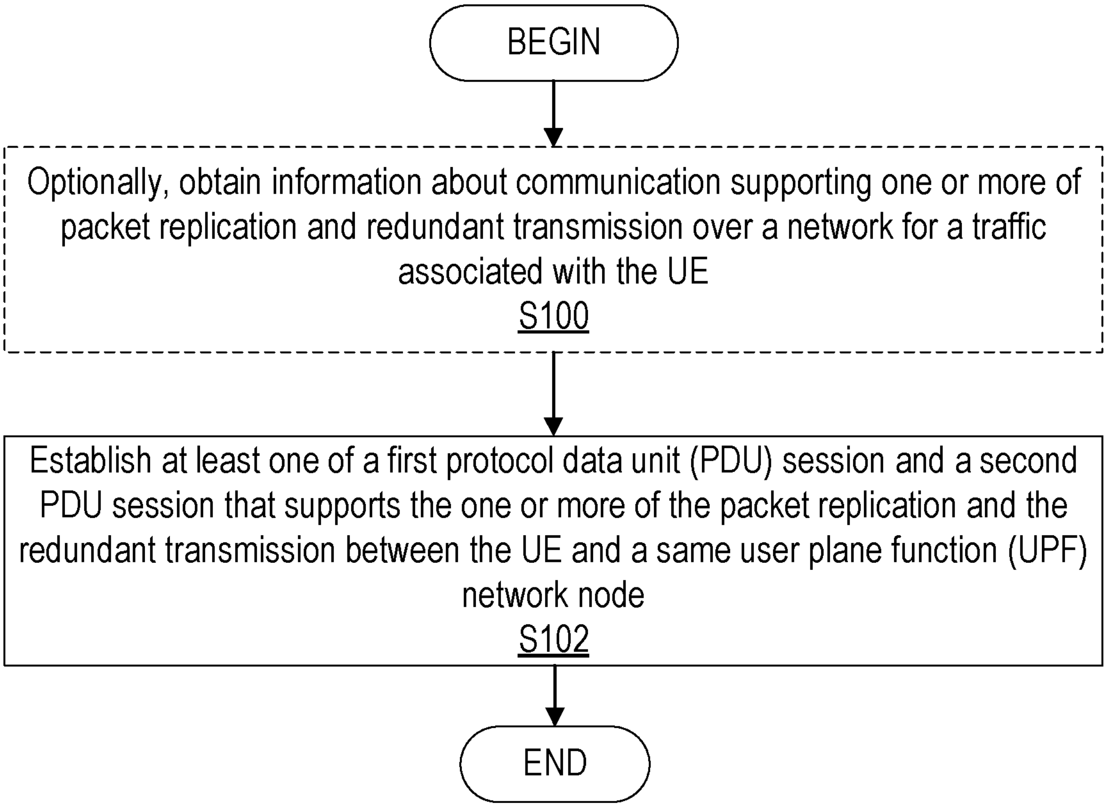
FIG. 3 is a flowchart of an example process in a network node (e.g., SMF, TSCTSF, etc.) according to some embodiments of the present disclosure.

FIG. 3 is a flowchart of an example process in a network node 16 (e.g., SMF, TSCTSF, etc.). One or more blocks described herein may be performed by one or more elements of network node 16 such as by one or more of processing circuitry 36 (including the selection unit 24), processor 38, and/or radio interface 30. Network node 16 such as via processing circuitry 36 and/or processor 38 and/or radio interface 30 is configured to optionally, obtain (Block S100) information about communication supporting one or more of packet replication and redundant transmission over a network for a traffic associated with the UE 22. Network node 16 such as via processing circuitry 36 and/or processor 38 and/or radio interface 30 is configured to establish (Block S104) at least one of a first protocol data unit (PDU) session and a second PDU session that supports the one or more of the packet replication and the redundant transmission between the UE 22 and a same user plane function (UPF) network node.

In some embodiments, network node 16 such as via processing circuitry 36 and/or processor 38 and/or radio interface 30 is configured to select the same UPF network node for both the first and second PDU sessions to support the one or more of the packet replication and the redundant transmission between the UE 22 and the same UPF network node. In some embodiments, the selection of the same UPF network node to use for both the first and second PDU session is based at least in part on one or more of: the obtained information, a data network name (DNN), a single-slice selection assistance information (S-NSSAI), an identifier of a pair/set of redundant PDU sessions comprising the first and second PDU sessions and an identifier of the UE 22.

In some embodiments, network node 16 such as via processing circuitry 36 and/or processor 38 and/or radio interface 30 is configured to obtain, derive and/or receive: (i) an identifier of a pair/set of redundant PDU sessions comprising the first and second PDU sessions; and (ii) an identifier of the UE 22. In some embodiments, the first and second PDU sessions are comprised in a pair/set of redundant PDU sessions associated with the UE 22 and the traffic; and an identifier of the pair/set of redundant PDU sessions is mapped an identifier of the UE 22. In some embodiments, network node 16 such as via processing circuitry 36 and/or processor 38 and/or radio interface 30 is configured to store an indication of the UPF network node selected for the first PDU session in a database and obtain the stored indication of the UPF network node to use for the second PDU session.

In some embodiments, network node 16 such as via processing circuitry 36 and/or processor 38 and/or radio interface 30 is configured to prior to the establishment of one of the first and second PDU sessions, determine whether the UPF network node has already been selected for the establishment of another one of the first and second PDU sessions. In some embodiments, network node 16 such as via processing circuitry 36 and/or processor 38 and/or radio interface 30 is configured to obtain the information by being configured to send an indication to at least one of the UE 22 and/or the UPF, the indication instructing the UE 22 and/or the UPF to one or more of: replicate of a first redundant packet for the first PDU session to produce a second redundant packet for the second PDU session; eliminate of one of a first redundant packet on the first PDU session and a second redundant packet on the second PDU session that are received from the same UPF network node; and perform the redundant transmission between the UE 22 and the same UPF network node.

In some embodiments, network node 16 such as via processing circuitry 36 and/or processor 38 and/or radio interface 30 is configured to as a result of obtaining/sending the information, receiving an acknowledgement from the UE 22 and/or the UPF indicating whether a replication and elimination function has been set up in accordance with the obtained information. In some embodiments, for downlink data send the information to the UE 22 prior to the same UPF network node receiving the information and/or sending an acknowledgement and for uplink data send the information to the UE 22 after the same UPF network node receives the information and/or sends an acknowledgement.

In some embodiments, one or more of: the obtained information that is sent to the UE 22 and/or the UPF network node comprises indications and/or parameters indicating and/or identifying one or more of: a replication and elimination protocol to be used at the UE/UPF, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and the granularity of the replication and elimination is one of per PDU session, per Quality-of-service (QOS) flow, and per traffic flow.

In some embodiments, at least one of the first and second PDU sessions comprises multiple instances of a replication and elimination function to support a per QoS or per traffic flow granularity. In some embodiments, network node 16 such as via processing circuitry 36 and/or processor 38 and/or radio interface 30 is configured to send and/or receive information indicating to one or more of: modify at least one parameter associated with the packet replication/elimination; and release a replication and elimination function associated with the first and second PDU sessions. In some embodiments, network node 16 such as via processing circuitry 36 and/or processor 38 and/or radio interface 30 is configured to send information to the UE 22 identifying the same UPF network node to initiate the establishment of the first and second PDU sessions.

In some embodiments, network node 16 such as via processing circuitry 36 and/or processor 38 and/or radio interface 30 is configured to request and/or receive information indicating a UE capability to support the packet replication/redundant transmission between the UE 22 and the same UPF network node. In some embodiments, one of more of: the UE 22 is a dual UE device comprising a first UE 22*a* and a second UE 22*b*; the network node 16 comprises a session management function (SMF); and the network node 16 comprises a Time Sensitive Communication and Time Synchronization function (TSCTSF).

Figure 4:
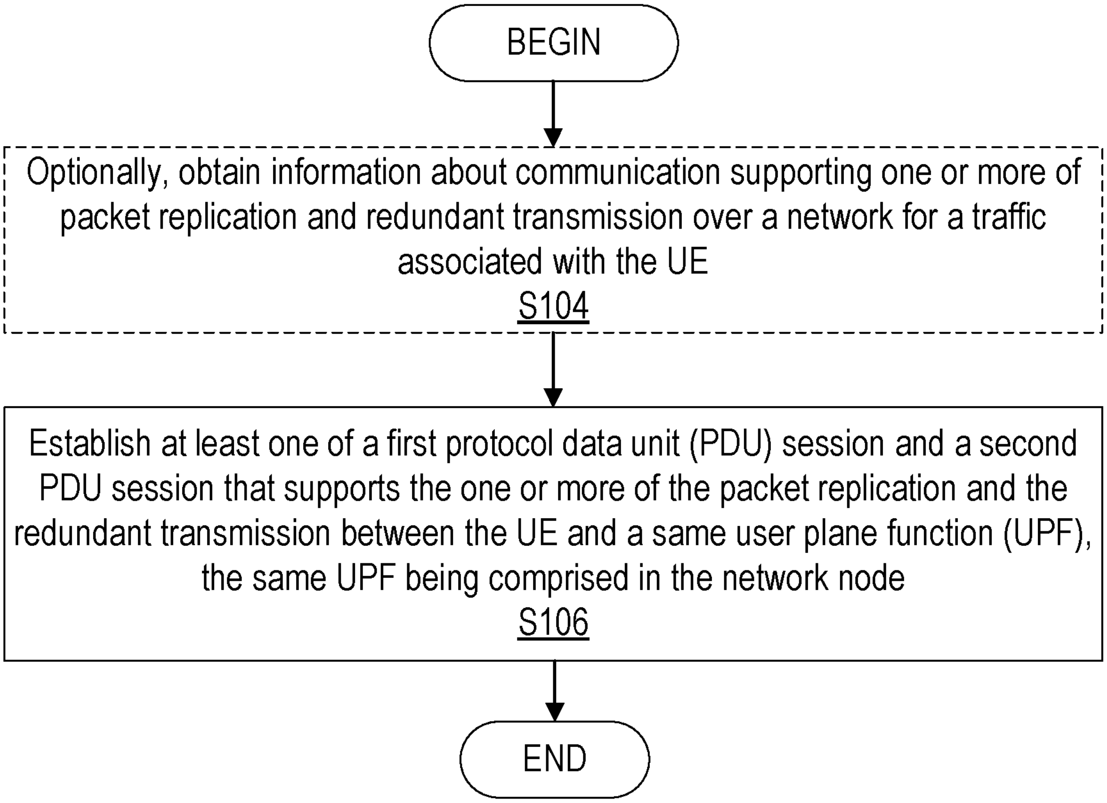
FIG. 4 is a flowchart of an example process in a network node (e.g., UPF) according to some embodiments of the present disclosure.

FIG. 4 is a flowchart of an example process in a network node 16 (e.g., UPF). One or more blocks described herein may be performed by one or more elements of network node 16 such as by one or more of processing circuitry 36 (including the RT NN unit 60), processor 38, and/or radio interface 30. Network node 16 such as via processing circuitry 36 and/or processor 38 and/or radio interface 30 is configured to optionally, obtain (Block S106) information about communication supporting one or more of packet replication and redundant transmission over a network for a traffic associated with the UE 22. Network node 16 such as via processing circuitry 36 and/or processor 38 and/or radio interface 30 is configured to establish (Block S108) at least one of a first protocol data unit (PDU) session and a second PDU session that supports the one or more of the packet replication and the redundant transmission between the UE 22 and a same user plane function (UPF), the same UPF being comprised in the network node.

In some embodiments, network node 16 such as via processing circuitry 36 and/or processor 38 and/or radio interface 30 is configured to transmit a first redundant packet on the first PDU session to the UE 22; replicate the first redundant packet to produce a second redundant packet; and transmit the second redundant packet on the second PDU session to the UE 22, the second redundant packet being the replication of first redundant packet. In some embodiments, network node 16 such as via processing circuitry 36 and/or processor 38 and/or radio interface 30 is configured to receive a first redundant packet on the first PDU session from the UE 22; receive a second redundant packet on the second PDU session from the UE 22; and eliminate one of the first and second redundant packets received from the UE 22.

In some embodiments, based at least in part on the obtained information, the same UPF network node is selected for both the first and second PDU sessions to support the packet replication/redundant transmission between the UE 22 and the same UPF network node. In some embodiments, a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE 22. In some embodiments, network node 16 such as via processing circuitry 36 and/or processor 38 and/or radio interface 30 is configured to obtain, derive and/or receive from a core network node an identifier of a pair/set of redundant PDU sessions comprising the first and second PDU sessions.

In some embodiments, the first and second PDU sessions are comprised in a pair/set of redundant PDU sessions associated with the UE 22 and the traffic; and an identifier of the pair/set of redundant PDU sessions is mapped an identifier of the UE 22. In some embodiments, the obtained information comprises an indication received from a core network node instructing the network node to perform the one or more of a packet elimination for uplink data associated with the traffic, a packet replication for downlink data associated with the traffic and the redundant transmission between the UE 22 and the same UPF network node. In some embodiments, network node 16 such as via processing circuitry 36 and/or processor 38 and/or radio interface 30 is configured to as a result of obtaining the information and/or establishing the first and second PDU sessions, send an acknowledgement to a core network node, the acknowledgement indicating whether a replication and elimination function has been set up in accordance with the obtained information.

In some embodiments, network node 16 such as via processing circuitry 36 and/or processor 38 and/or radio interface 30 is configured to obtain the information by being configured to: for downlink data the information is received at the UE 22 prior to the UPF receiving the information and/or sending an acknowledgement and for uplink data the information at the UE 22 after the UPF receives the information and/or sends an acknowledgement. In some embodiments, one or more of: the obtained information comprises indications and/or parameters indicating and/or identifying one or more of: a replication and elimination protocol to be used at the UE 22, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and the granularity of the replication and elimination is one of per PDU session, per Quality-of-service (QOS) flow, and per traffic flow.

In some embodiments, at least one of the first and second PDU sessions comprises multiple instances of a replication and elimination function to support a per QoS or per traffic flow granularity. In some embodiments, network node 16 such as via processing circuitry 36 and/or processor 38 and/or radio interface 30 is configured to send and/or receive information indicating to one or more of: modify at least one parameter associated with the packet replication/elimination; and release a replication and elimination function associated with the first and second PDU sessions. In some embodiments, network node 16 such as via processing circuitry 36 and/or processor 38 and/or radio interface 30 is configured to determine to establish the first and second PDU sessions to support the packet replication/redundant transmission between the UE 22 and the same UPF network node when the information is obtained from two different session management function (SMF) network nodes and/or at least one parameter comprised in the information are a same.

In some embodiments, the UE 22 is a dual UE device comprising a first UE 22*a* and a second UE 22*b*. In some embodiments, network node 16 such as via processing circuitry 36 and/or processor 38 and/or radio interface 30 is configured to send information identifying the UPF network node to the UE 22 to initiate the establishment of the first and second PDU sessions to support the packet replication/redundant transmission between the UE 22 and the same UPF network node. In some embodiments, network node 16 such as via processing circuitry 36 and/or processor 38 and/or radio interface 30 is configured to send information indicating a UPF capability to support the packet replication/redundant transmission between the UE 22 and the same UPF network node.

Figure 5:
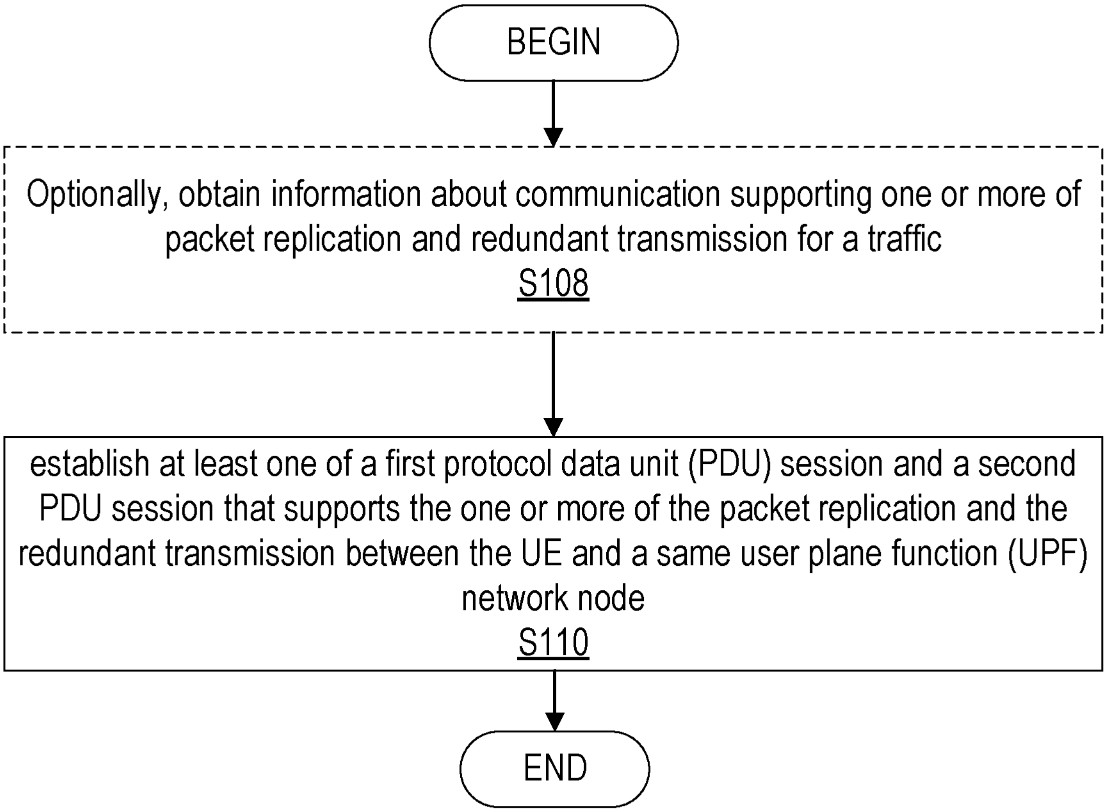
FIG. 5 is a flowchart of an example process in a user equipment (UE) according to some embodiments of the present disclosure.

FIG. 5 is a flowchart of an example process in a UE 22 according to some embodiments of the present disclosure. One or more blocks described herein may be performed by one or more elements of UE 22 such as by one or more of processing circuitry 50 (including the RT UE unit 26), processor 52, and/or radio interface 46. UE 22 such as via processing circuitry 50 and/or processor 52 and/or radio interface 46 is configured to optionally, obtain (Block S108) information about communication supporting one or more of packet replication and redundant transmission for a traffic. UE 22 such as via processing circuitry 50 and/or processor 52 and/or radio interface 46 is configured to establish (Block S110) a first protocol data unit (PDU) session and a second PDU session that supports the one or more of the packet replication and the redundant transmission between the UE 22 and a same user plane function (UPF) network node.

In some embodiments, UE 22 such as via processing circuitry 50 and/or processor 52 and/or radio interface 46 is configured to transmit a first redundant packet on the first PDU session to the same UPF network node; replicate the first redundant packet to produce a second redundant packet; and transmit the second redundant packet on the second PDU session to the same UPF network node, the second redundant packet being the replication of first redundant packet. In some embodiments, UE 22 such as via processing circuitry 50 and/or processor 52 and/or radio interface 46 is configured to receive a first redundant packet on the first PDU session from the same UPF network node; receive a second redundant packet on the second PDU session from the same UPF network node; and eliminate one of the first and second redundant packets received from the same UPF network node.

In some embodiments, based at least in part on the obtained information, the same UPF network node is selected for both the first and second PDU sessions to support the packet replication/redundant transmission between the UE 22 and the same UPF network node. In some embodiments, a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE 22. In some embodiments, UE 22 such as via processing circuitry 50 and/or processor 52 and/or radio interface 46 is configured to obtain, derive and/or receive from a core network node an identifier of a pair/set of redundant PDU sessions comprising the first and second PDU sessions. In some embodiments, the first and second PDU sessions are comprised in a pair/set of redundant PDU sessions associated with the UE 22 and the traffic; and an identifier of the pair/set of redundant PDU sessions is mapped an identifier of the UE 22.

In some embodiments, the obtained information comprises an indication received from a core network node instructing the UE 22 to perform the one or more of a packet replication for uplink data associated with the traffic, a packet elimination for downlink data associated with the traffic and the redundant transmission between the UE 22 and the same UPF network node. In some embodiments, UE 22 22 such as via processing circuitry 50 and/or processor 52 and/or radio interface 46 is configured to as a result of obtaining the information and/or establishing the first and second PDU sessions, send an acknowledgement to a core network node, the acknowledgement indicating whether a replication and elimination function has been set up in accordance with the obtained information.

In some embodiments, UE 22 such as via processing circuitry 50 and/or processor 52 and/or radio interface 46 is configured to obtain the information by being configured to: for downlink data receive the information at the UE 22 prior to the same UPF receiving the information and/or sending an acknowledgement and for uplink data receive the information at the UE 22 and/or sending an acknowledgement after the same UPF receiving the information. In some embodiments, one or more of: the obtained information comprises indications and/or parameters indicating and/or identifying one or more of: a replication and elimination protocol to be used at the UE 22, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform reordering, a time interval to wait for a missing redundant packet to arrive, and a traffic type to apply the replication and elimination; and the granularity of the replication and elimination is one of per PDU session, per Quality-of-service (QOS) flow, and per traffic flow.

In some embodiments, at least one of the first and second PDU sessions comprises multiple instances of a replication and elimination function to support a per QoS or per traffic flow granularity. In some embodiments, UE 22 such as via processing circuitry 50 and/or processor 52 and/or radio interface 46 is configured to send and/or receive information indicating to one or more of: modify at least one parameter associated with the packet replication/elimination; and release a replication and elimination function associated with the first and second PDU sessions.

In some embodiments, UE 22 such as via processing circuitry 50 and/or processor 52 and/or radio interface 46 is configured to determine to establish the first and second PDU sessions to support the packet replication/redundant transmission between the UE 22 and the same UPF network node when the information is obtained from two different session management function (SMF) network nodes and/or at least one parameter comprised in the information are a same. In some embodiments, the UE 22 is a dual UE device comprising a first UE 22*a* and a second UE 22*b*. In some embodiments, UE 22 such as via processing circuitry 50 and/or processor 52 and/or radio interface 46 is configured to receive information identifying the same UPF network node to initiate the establishment of the first and second PDU sessions. In some embodiments, UE 22 such as via processing circuitry 50 and/or processor 52 and/or radio interface 46 is configured to send information indicating a UE capability to support the packet replication/redundant transmission between the UE 22 and the same UPF network node.

Figure 6:
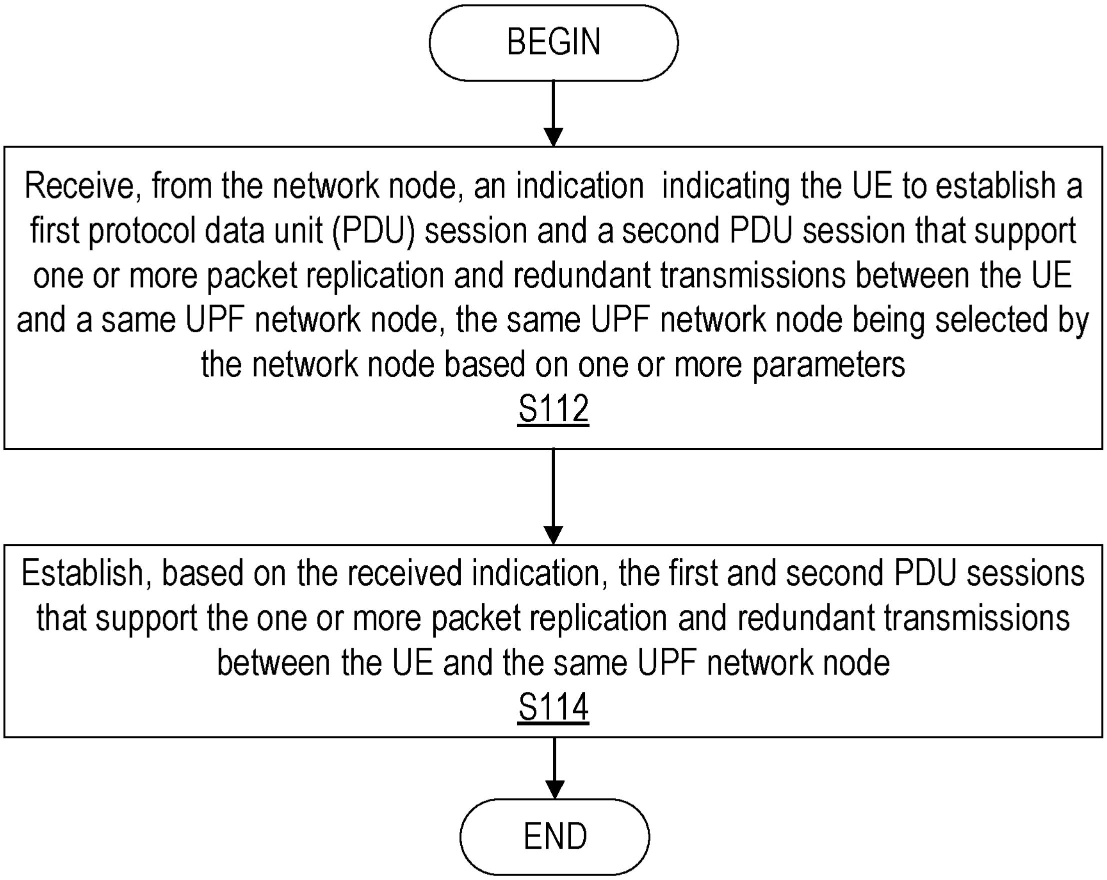
FIG. 6 is a flowchart of another example process in in a user equipment (UE) according to some embodiments of the present disclosure.

FIG. 6 is a flowchart of another example process in a UE 22 according to some embodiments of the present disclosure. One or more blocks described herein may be performed by one or more elements of UE 22 such as by one or more of processing circuitry 50 (including the RT UE unit 26), processor 52, and/or radio interface 46. UE 22 such as via processing circuitry 50 and/or processor 52 and/or radio interface 46 is configured to receive (Block S112), from the network node 16, an indication indicating the UE 22 to establish a first protocol data unit (PDU) session 70*a* and a second PDU session 70*b* that support one or more packet replication and redundant transmissions between the UE 22 and a same UPF network node. The same UPF network node 16*f* is selected by the network node 16 based on one or more parameters. Further, UE 22 such as via processing circuitry 50 and/or processor 52 and/or radio interface 46 is configured to establish (Block S114), based on the received indication, the first and second PDU sessions 70*a*, 70*b* that support the one or more packet replication and redundant transmissions between the UE 22 and the same UPF network node 16*f*. In some embodiments, the one or more parameters includes at least one of information about communication supporting the one or more packet replication and redundant transmissions over a network for a traffic associated with the UE 22; a data network name (DNN); a single-network slice selection assistance information (S-NSSAI); and a first identifier of the UE 22.

In some other embodiments, based on the received indication, the method further includes one or more of replicating of a first redundant packet for the first PDU session 70*a* to produce a second redundant packet for the second PDU session 70*b*; eliminating of one of a first redundant packet on the first PDU session 70*a* and a second redundant packet on the second PDU session 70*b* that is received from the same UPF network node 16*f*; and performing one or more redundant transmissions between the UE 22 and the same UPF network node 16*f*.

In an embodiment, the method further includes transmitting, to the network node 16, an acknowledgement indicating at least one of the indication has been successfully received and whether a replication and elimination function has been set up.

In another embodiment, wherein, when the same UPF network node 16*f* is selected for the first PDU session 70*a*. Information about the same UPF being selected for the first PDU session 70*a* is used for a selection of the same UPF network node 16*f* for the second PDU session 70*b*.

In some embodiments, the information about the same UPF being selected includes a second identifier of the first and second PDU sessions 70*a*, 70*b*.

In some other embodiments, whether the same UPF has already been selected for the first and second PDU sessions is based at least in part on the second identifier. The same UPF network node 16*f* is selected based on whether the same UPF has already been selected.

In an embodiment, the second identifier includes at least a pair identifier associated with the first and second PDU sessions 70*a*, 70*b* and a UE identifier mapped to the pair identifier.

In another embodiment, the second identifier is included in the one or more parameters.

In some embodiments, the UE 22 is a dual UE 22 device comprising a first UE 22*a* and a second UE 22*b*. The first PDU session 70*a* supports one or more packet replication and redundant transmissions between the first UE 22*a* and the same UPF network node 16*f*. The second PDU session supports the one or more packet replication and redundant transmissions between the second UE 22*b* and the same UPF network node 16*f*.

In an embodiment, the method further includes transmitting capability information indicating a UE capability to support the one or more packet replication and redundant transmissions between the UE 22 and the same UPF network node 16*f*.

In another embodiment, the network node 16 comprises one of more of a session management function (SMF); and a time sensitive communication and time synchronization function (TSCTSF).

Figure 7:
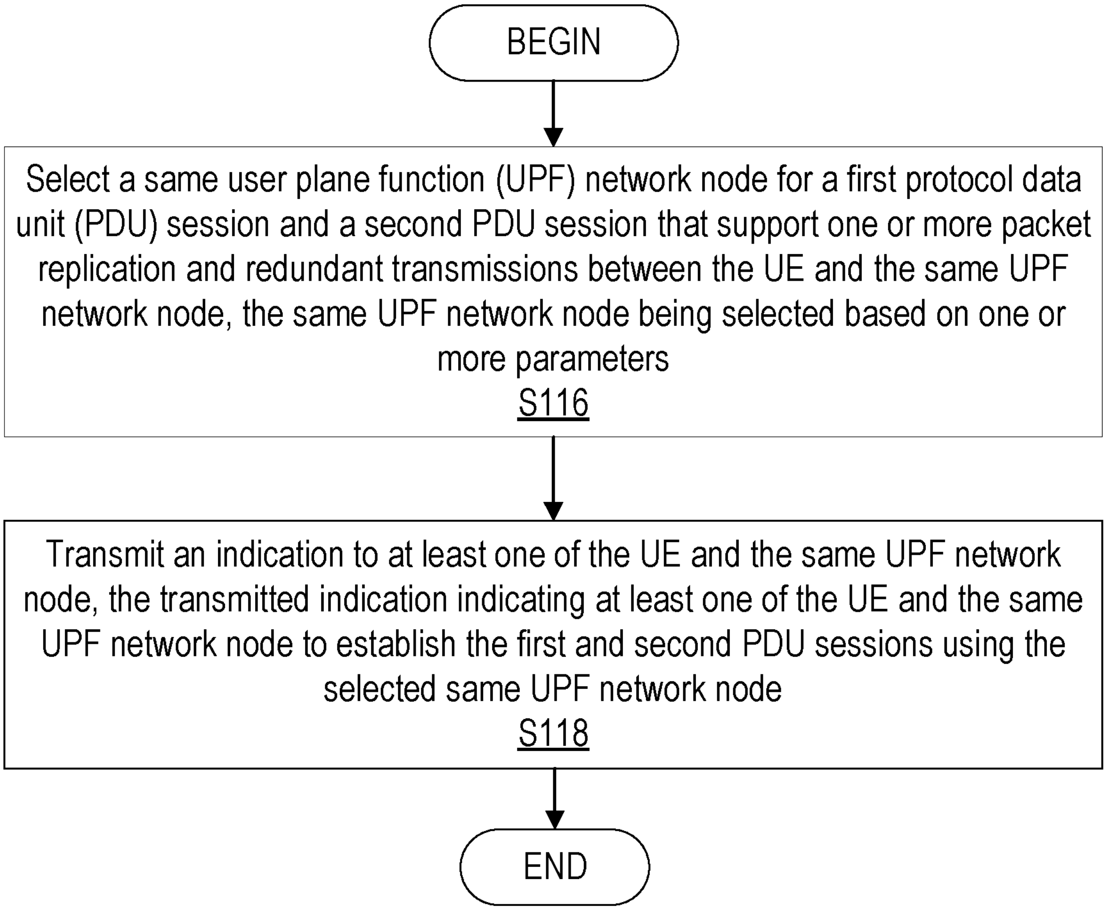
FIG. 7 is a flowchart of an example process in another network node (e.g., SMF, TSCTSF, etc.) according to some embodiments of the present disclosure.

FIG. 7 is a flowchart of an example process in a network node 16 (e.g., a network node 16*d*, an SMF, a TSCTSF, etc.). One or more blocks described herein may be performed by one or more elements of network node 16 such as by one or more of processing circuitry 36 (including the selection unit 24), processor 38, and/or radio interface 30. Network node 16 such as via processing circuitry 36 and/or processor 38 and/or radio interface 30 is configured to select (Block S116) a same user plane function (UPF) network node 16*f* for a first protocol data unit (PDU) session 70*a* and a second PDU session 70*b* that support one or more packet replication and redundant transmissions between the UE 22 and the same UPF network node 16*f*. The same UPF network node 16*f* being selected based on one or more parameters. Further, network node 16 such as via processing circuitry 36 and/or processor 38 and/or radio interface 30 is configured to transmit (Block S118) an indication to at least one of the UE 22 and the same UPF network node 16*f*. The transmitted indication indicates at least one of the UE 22 and the same UPF network node 16*f* to establish the first and second PDU sessions 70*a*, 70*b* using the selected same UPF network node 16*f*.

In some embodiments, the one or more parameters includes at least one of information about communication supporting the one or more packet replication and redundant transmissions over a network for a traffic associated with the UE 22; a data network name (DNN); a single-network slice selection assistance information (S-NSSAI); and a first identifier of the UE 22.

In some other embodiments, the transmitted indication further triggers the at least one of the UE 22 and the same UPF to one or more of replicate of a first redundant packet for the first PDU session to produce a second redundant packet for the second PDU session; eliminate of one of a first redundant packet on the first PDU session and a second redundant packet on the second PDU session that is received from the same UPF network node 16*f*; and perform one or more redundant transmissions between the UE 22 and the same UPF network node 16*f*.

In another embodiment, the method further includes receiving an acknowledgement from at least one of the UE 22 and the same UPF indicating at least one of the indication has been successfully received and whether a replication and elimination function has been set up.

In another embodiment, the selection of the same UPF network node 16*f* for the first PDU session and the second PDU session further includes, when the same UPF network node 16*f* is selected for the first PDU session 70*a*: storing information about the same UPF being selected for the first PDU session; retrieving the information for a selection of the same UPF network node 16*f* for the second PDU session 70*b*.

In some embodiments, the method further includes storing the information about the same UPF being selected and a second identifier of the first and second PDU sessions 70*a*, 70*b*.

In some other embodiments, the method further includes determining whether the same UPF has already been selected for the first and second PDU sessions 70*a*, 70*b* based at least in part on the second identifier. The selection of the same UPF network node 16*f* is based on whether the same UPF has already been selected.

In an embodiment, the second identifier includes at least a pair identifier associated with the first and second PDU sessions 70*a*, 70*b* and a UE identifier mapped to the pair identifier.

In another embodiment, the second identifier is included in the one or more parameters.

In some embodiments, the UE 22 is a dual UE 22 device comprising a first UE 22*a* and a second UE 22*b*. The first PDU session 70*a* supports one or more packet replication and redundant transmissions between the first UE 22*a* and the same UPF network node 16*f*. The second PDU session 70*b* supports the one or more packet replication and redundant transmissions between the second UE 22*b* and the same UPF network node 16*f*.

In an embodiment, the method further includes receiving capability information indicating one of a UE capability and a UPF capability to support the one or more packet replication and redundant transmissions between the UE 22 and the same UPF network node 16*f*.

In another embodiment, the network node comprises one of more of a session management function (SMF) and a time sensitive communication and time synchronization function (TSCTSF).

Having described the general process flow of arrangements of the disclosure and having provided examples of hardware and software arrangements for implementing the processes and functions of the disclosure, the sections below provide details and examples of arrangements for user plane redundancy.

It is understood that, although some of the example arrangements describe two PDU sessions 70, both PDU sessions 70 and a pair of PDU sessions, it is contemplated that some embodiments may involve more than 2 PDU sessions 70 having redundant traffic/duplicate/copies of data packets. In such case the applicable terminology may instead include one or more of: “multiple PDU sessions”, “a plurality of PDU sessions”, “a set of two more PDU sessions”, “a set of PDU sessions” and/or a “PDU session set ID”.

In some embodiments, the terms “packet” and “frame” may be used interchangeably. In some embodiments, the terms “replicate” and “duplicate” and “redundant” may be used interchangeably.

In some other embodiments, a replication and elimination (R/E) function is described. In one or more embodiments, the R/E refers to the RT UE unit 26 (e.g., the RT UE unit 26 performs the R/E functions) such as when the R/E is associated with the UE 22. In some embodiments, the R/E refers to the RT NN unit 60 (e.g., the RT NN unit 60 performs the R/E functions) such as when the R/E is associated with the network node (NN) 16.

Further, in some embodiments, a receiver (and/or receiver side) and a transmitter (and/or transmitter side) is described. The receiver (and/or receiver side) may refer to any of the UE 22 and/or NN 16 (such as a UPF). Similarly, the transmitter (and/or transmitter side) may refer to any of the UE 22 and/or NN 16 (such as a UPF).

Example Solution

Figure 8:
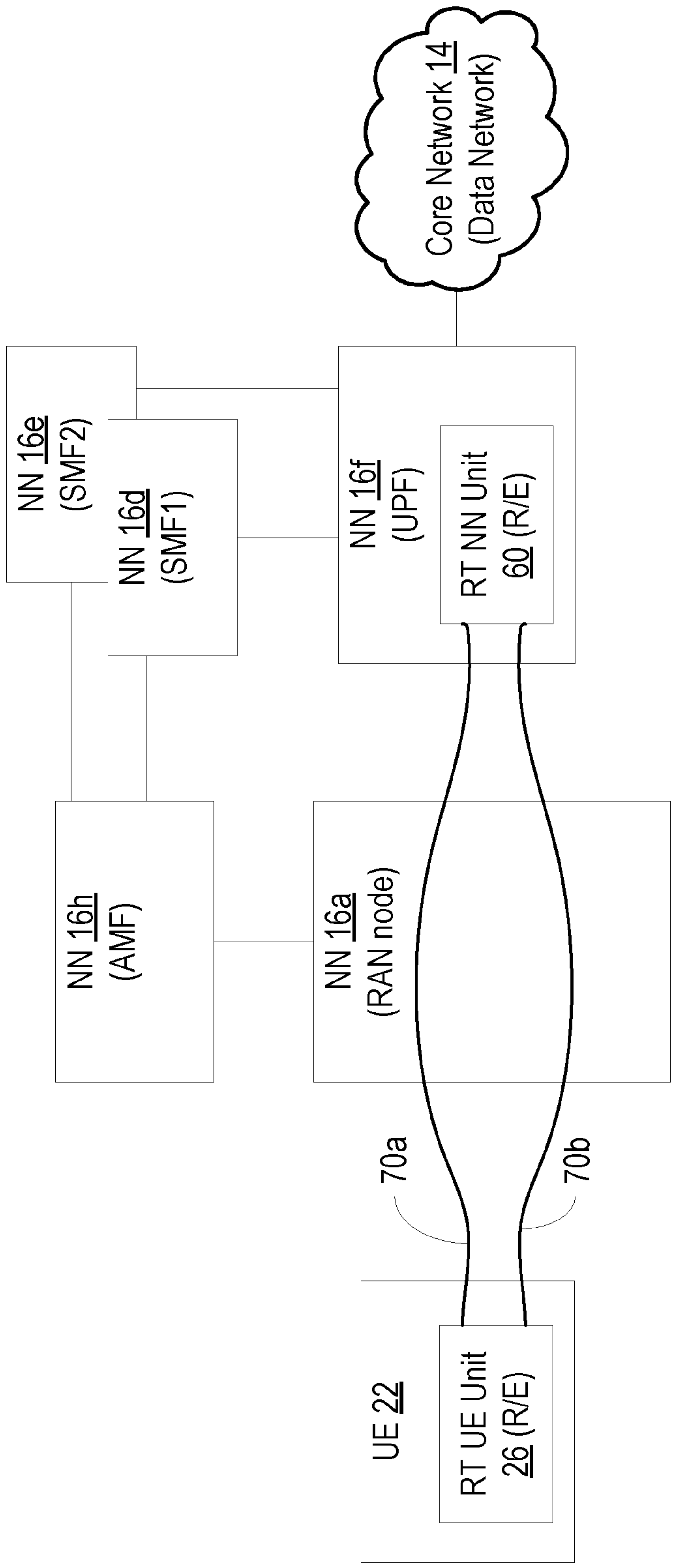
FIG. 8 is a schematic diagram of another example network architecture according to principles disclosed herein.

An example solution is illustrated in FIG. 8. In this example, the terminal device (e.g., UE 22) establishes two PDU sessions 70 (e.g., a first PDU session 70*a* and a second PDU session 70*b*) to the same UPF network node (NN) 16*f* in the core network 14. In some embodiments, the SMF network nodes 16*d* and 16*e* do not necessarily have to be the same for the two PDU sessions 70. The two PDU sessions 70 may use dual connectivity to achieve redundancy in the network node 16 (such as RAN network node 16*a*).

The terminal device (e.g., UE 22) and the UPF network node 16*f* include a replication and elimination (R/E) function (e.g., performed via RT UE unit 26 and RT NN unit 60, respectively) that is responsible for replicating the packets and sending them on both PDU sessions 70 on the transmitter side (e.g., UE 22) and eliminating duplicate(s) on the receiving side (e.g., NN 16*f*). The receiver may also reorder the packets using a reordering function. The replication, elimination and reordering functions can make use of a sequence numbering that is used on the packets. The packets may also carry a flow identification (even though in this case the flow identification could be skipped since in many deployments there would be just a single flow between the UE 22 and the UPF network node 16*f* for which redundancy is applied). The redundancy may be applied on a per QoS flow granularity independently (some QoS flows may skip redundancy), and the QoS flow may anyway be identified using the QFI as the identifier between the UE 22 and the UPF network node 16*f*.

In some embodiments, the replication and elimination function may be realized as part of the UE 22 and the UPF network node 16*f*, or, in some embodiments, may be realized outside the UE 22 and the UPF network node 16*f*, but coupled with the UE 22 and the UPF network node 16*f* so that the relevant 3GPP information is transferred between the R/E entity and the UE/UPF. (As it will be described below, some embodiments of the solution are also applicable in case there are multiple UEs 22 within a device).

One or more example steps which may be included in the solution are as follows:

1. The UE 22 (e.g., comprised in a terminal device) establishes two PDU sessions 70 for redundancy. During the selection of the UPF network node 16*f*, the same UPF network node 16*f* (e.g., a single UPF, not more than one UPF, etc.) is selected for both PDU sessions 70. This may be achieved by basing the UPF selection on an identifier that is implicitly or explicitly provided by the terminal device for at least one of the PDU session UPF network node 16*f* selection decision. More details regarding how the same UPF network node 16*f* can be selected for the two (or more) PDU sessions 70 are described below.

Figure 9:
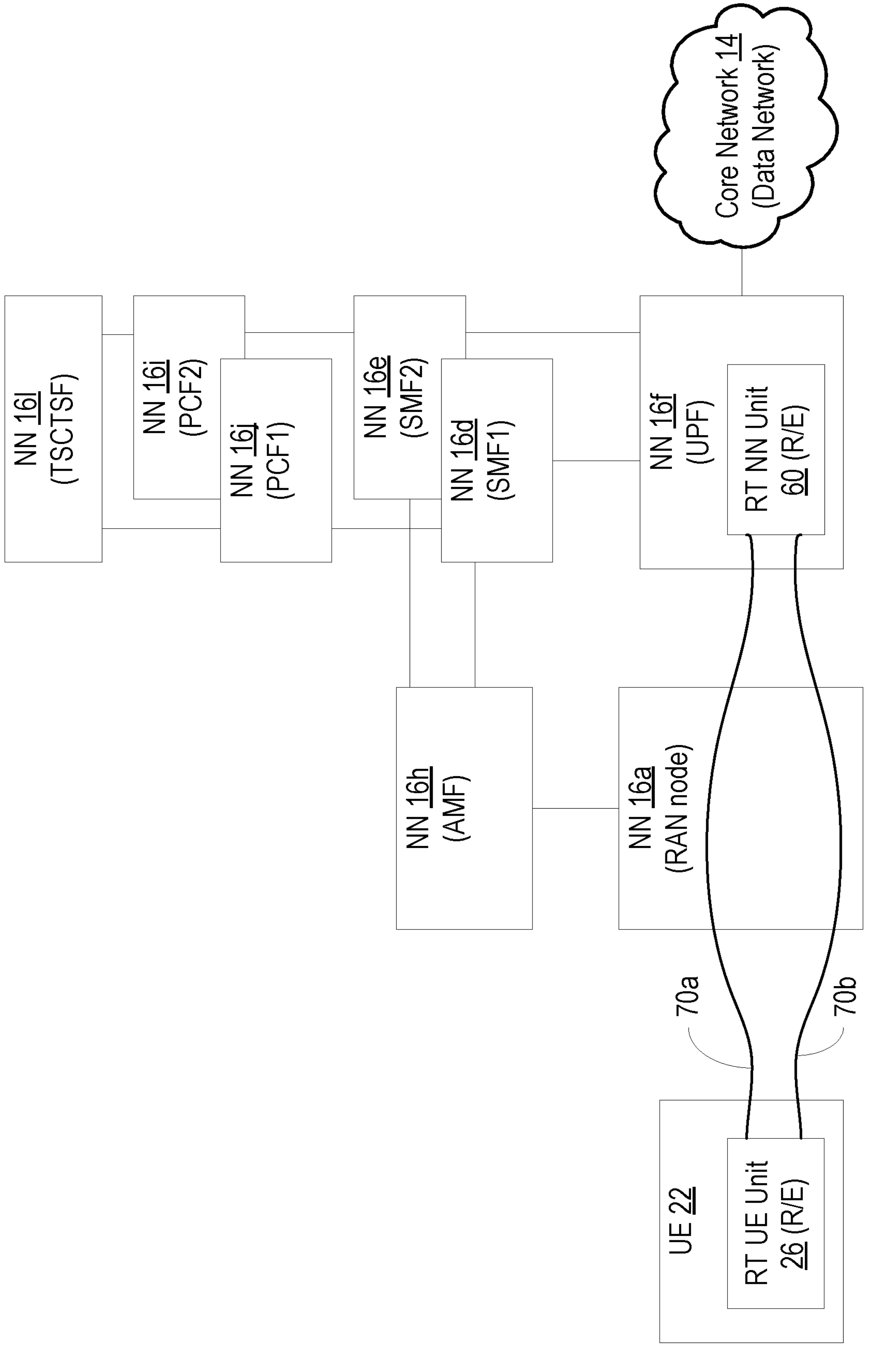
FIG. 9 is a schematic diagram of yet another example network architecture according to principles disclosed herein.

2. Sending an indication from a core network entity (such as an SMF network nodes 16*d* and/or 16*e* as shown in FIG. 8, or from a TSCTSF network node 161 as shown in FIG. 9) to the UE 22 (e.g., comprised in a terminal device) and to the UPF network node 16*f* to perform the replication and elimination (R/E) function. It may be possible to send multiple such indications when useful. The indication may be sent first to the receiver side (and wait for the acknowledgement), and then to the sending/transmitting side, so that the receiver is already in operation when the replication actually starts. The indication may contain one or more of the following parameters:

- An indication of the replication and elimination protocol to be used, such as IEEE TSN FRER, or other protocols.
- An indication of which header field (e.g., in the packet) to use as the sequence number. It may be possible to add a new header field for sequence numbering, but it could also be possible to use the combination of PDCP sequence numbers and GTP sequence numbers, e.g., so that the RAN network node 16*a* maps between these two types of sequence numbers (mapping may mean equal sequence numbers, or making a transformation such as adding a constant number to one sequence number to get the other sequence number).
- An indication about whether any flow identification is to be used, and if so, which header field (e.g., in the packet) to use as the flow identifier.
- An indication of the granularity of the replication and elimination function. The granularity may be per PDU session, or per QoS flow, or per traffic flow. In cases of granularity per QoS flow or per traffic flow, multiple instances of the replication and elimination function may exist within a single PDU session (e.g., as there may be multiple QoS and traffic flows in a single PDU session). In cases the granularity is per QoS flow, an indication may be sent regarding which QoS flow the replication and elimination function is to be applied.
- An indication of the traffic flow specification, a filtering criteria based on a combination of the header fields, which may determine which packets the replication and elimination applies to.
- An indication of whether or not to perform re-ordering at the receiver side.
- Additional parameters of the replication and elimination, such as a time period associated with replication and/or elimination, e.g., a maximum time interval the receiver waits for a missing packet to arrive, etc.

In some embodiments, the UE 22 (e.g., comprised in a terminal device) as well as the UPF network node 16*f* may provide a feedback to indicate whether the information was successfully received, and whether the replication and elimination functions could be properly set up and/or applied to the packets. Similarly for the establishment, indications may be sent to modify the parameters or to release the replication and elimination functions.

In some embodiments, there may be multiple options from which entity/network node 16 the indication is sent from. Example network node 16 indication arrangements are described below:

- In one embodiment, the indication may be sent from the SMF network nodes 16*d* and 16*e*. Note that it may be possible that the two PDU sessions 70 have separate SMF network nodes 16*d* and 16*e*, and then both SMF network nodes 16*e* and 16*e* send an indication. This means that each of the UE 22 (e.g., comprised in a terminal device) and the UPF network node 16*f* may receive two indications (from each of the SMF network nodes 16*d* and 16*e*). UE 22 (e.g., comprised in a terminal device) and UPF network node 16*f* may check for both indications, and establish the replication and elimination function when the indication is received from both SMF network nodes 16*d* and 16*e*, and that both indications include the same information. The SMF network nodes 16*d* and 16*e* may indicate that the receiver of the indication should get two such indications. In case the SMF network nodes 16*d* and 16*e* may provide different parameters. Those parameters that differ may be ignored/discarded by the receiver of the parameters, e.g., UE 22 (e.g., comprised in a terminal device) and UPF network node 16*f*. The SMF network nodes 16*d* and 16*e* may include configurations based on which the SMF network nodes 16*d* and 16*e* would normally provide the same information, which can be based on e.g., subscription, local configuration and UE provided parameters (such as the domain network name (DNN), single-network slice selection assistance information (S-NSSAI), the redundancy pair identifier (ID) and the retransmission sequence number (RSN)). In case of parameter differences, an error indication may be sent by the receiving entity, e.g., UE 22 (e.g., comprised in a terminal device) and UPF network node 16*f*. In some embodiments, in cases when the receiving entity receives the first indication from a first SMF network node 16*d*, it may reply with an indication that this was the first message, meaning that the redundancy is not yet established.

In certain deployments, it may be possible to have always the same SMF network node 16*d* for both PDU sessions 70 based on configuration, in which case it can be sufficient to send a single indication (and in that case, having only a single indication can be also indicated in the indication message). Alternatively, in some embodiments, in the case of multiple SMF network nodes 16*d* and 16*e*, it may also be possible that the SMF network nodes 16*d* and 16*e* signal to each other and determine that only one of them will send an indication (and they may determine which SMF network node 16*d* or 16*e* should be that one that sends the indication).

Additionally, or alternatively, in some embodiments, the indication may be sent from a central entity/network node, such as a TSCTSF network node 161, which may be common for both PDU sessions 70. In this case, the TSCTSF network node 161 may obtain an indication about the PDU sessions 70 that are established which are candidates for redundant handling. When both PDU sessions 70 are established, the TSCTSF network node 161 may send an indication to both the UE 22 (e.g., comprised in a terminal device) and the UPF network node 16*f*. This indication may be sent on any of the PDU sessions 70. An example of this optional arrangement is shown in FIG. 9. It may be possible to use another network node 16, instead of the TSCTSF network node 161 for this type of central coordination.

In some embodiments, the indication, or parts of the indication, may use a message format or parameter encoding and modelling framework that is specified e.g., in the IEEE or in the IETF.

Selecting the Same UPF

As described above, the same UPF network node 16*f* may be selected for both PDU sessions 70 which may constitute a PDU session pair ("pair"). This may be achieved in several ways, which will be discussed below. The pair of the PDU sessions 70 that are redundant could be determined based on the combinations of information e.g., (DNN, S-NSSAI), and the PDU session pair ID, which may be provided by the UE 22. If the UE 22 does not provide the PDU session pair ID, then the combination of information e.g., (DNN, S-NSSAI) may be used to derive the PDU session pair ID. In some embodiments, a PDU session pair ID may be used only in deployments when a single terminal device (e.g., single UE 22) may establish multiple pairs of redundant PDU sessions 70.

In some embodiments, an identification of the terminal device and/or UE 22 may be used as well. This can be different depending on the use case. For example:

In cases the terminal device includes a single UE 22 which establishes multiple PDU sessions 70 based on dual connectivity. The terminal device ID may be a UE identifier such as the international mobile subscriber identity/5G globally unique subscription permanent identifier (IMSI/SUPI), or permanent equipment identifier/international mobile equipment identity (PEI/IMEI), or other identifier which is part of the UE 22 subscription or that is provided by the UE 22.

In cases the terminal device includes two (or more) UEs 22, then the terminal device identifier may be a device ID which is part of the subscription or provided by the UE 22. The same device ID may be used for both PDU sessions 70.

Storing the Selected UPF

In some embodiments, when the UPF network node 16*f* is selected for the first PDU session 70*a*, the selection is stored in memory, and retrieved for the second PDU session 70*b*. The memory may comprise a database and/or refer to memory 40, 54. The selected UPF network node 16*f* can be identified by e.g., its Internet Protocol (IP) address and/or a fully qualified domain name (FQDN) and/or using another identifier for the UPF network node 16*f*. For this mechanism, there may be a central database, for which information about the selected UPF network node 16*f* is stored together with a unique identifier for the pair of redundant PDU sessions 70. In some embodiments, the pair can be identified by a unique identifier of the terminal device (and/or UE) and the PDU session pair ID.

In this option, in some embodiments, when a PDU session is established, the SMF network node 16*d* may determine a unique pair identifier (e.g., which may be composed of a device ID and an ID of the PDU session pair within the device), and checks in the database whether a UPF network node 16*f* has been selected for this pair of redundant PDU sessions 70. If not, then the SMF network node 16*d* may select any UPF network node 16*f* and store it in the database together with the unique pair identifier. If yes, then the SMF network node 16*d* may re-use the previously selected UPF network node 16*f* for the redundant PDU session.

Mapping the terminal device ID to the UPF. In this alternative, the UPF network node 16*f* is selected based on the unique pair ID (composed of the terminal device ID and the pair ID). Since this is the same for both PDU sessions 70, the same UPF network node 16*f* will be selected. The selection may, for example, use a hashing function to map the unique pair ID to the selected UPF network node 16*f*. This results in the same UPF network node 16*f* being selected even if determined by the different SMF network nodes 16*d* and 16*e* separately. It may be possible also that the terminal device provides a UPF selector base parameter (such as a random value) that is the same for both PDU sessions 70, and that UPF selector base parameter may be used as the basis of UPF selection (e.g., using a hash function).

UPF selection indicated to the terminal device. It may also be an option to indicate the selected UPF network node 16*f* (identified by its IP address or by an FQDN or other identifier) to the terminal device, and the terminal device indicates this when the second PDU session 70*b* is established, so that the same UPF network node 16*f* is selected for both PDU sessions 70 based on that information.

Multiple UEs Per Terminal Device

FIG. 9 shows the case of a single UE 22 with multiple PDU sessions 70 using dual connectivity. As mentioned earlier, the solution equally applies in the case when redundancy is provided using two UEs 22 within a single terminal device. That scenario is illustrated in FIG. 10.

Figure 10:
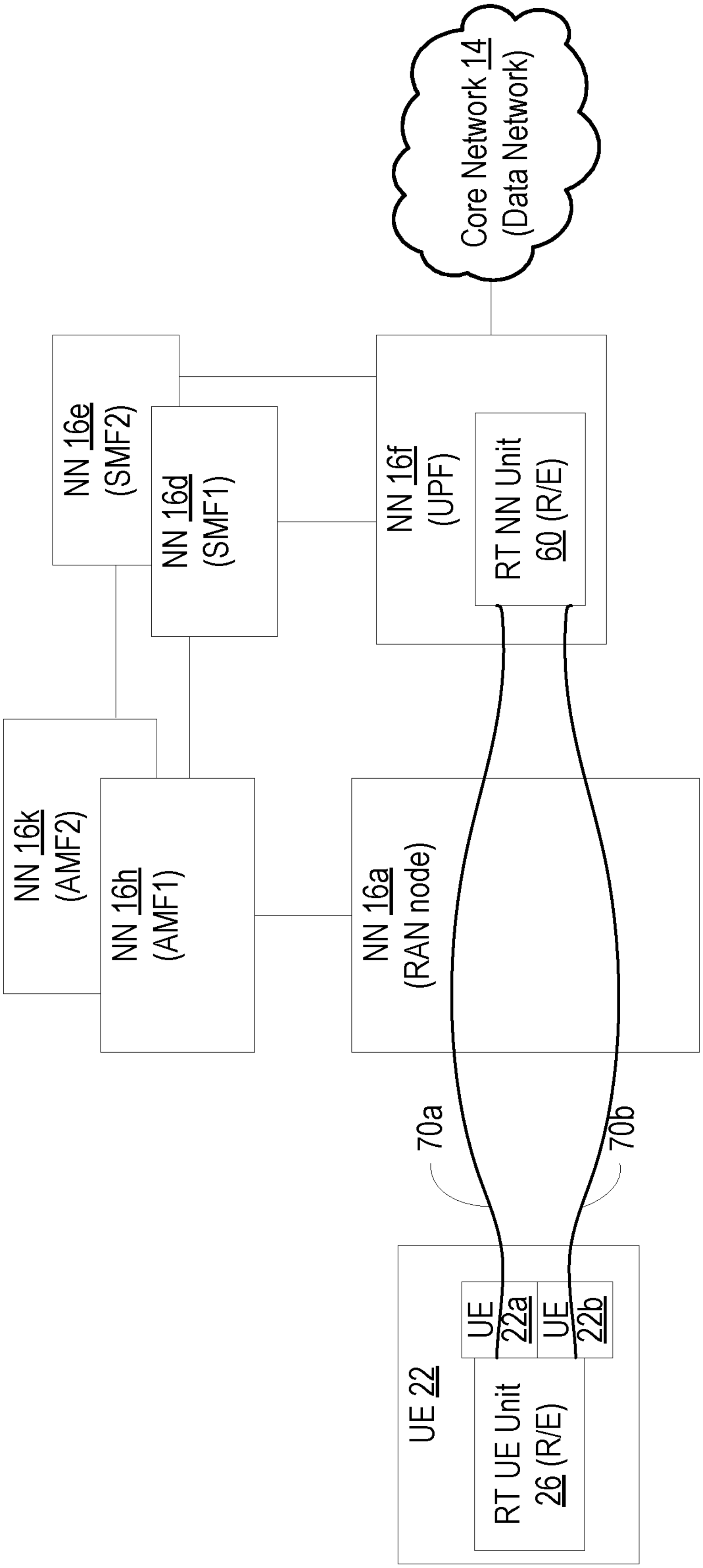
FIG. 10 is a schematic diagram of another example network architecture according to principles disclosed herein.

As shown in the example of FIG. 10, in some embodiments, the replication and elimination (R/E) entity is within the UE 22 (e.g., comprised in a terminal device). The UE 22 may comprise a first UE 22*a* and a second UE 22*b*. The R/E may be a common function for both UEs 22 (or individually performed by their respective RT UE units 26). This scenario works as described above; however, both UEs 22 may be configured to provide the information regarding the R/E entity to be delivered up to the R/E function using an internal application programming interface (API) within the terminal device. Also, the response of the R/E may be delivered via the UEs 22.

It is noted that, with two UEs 22, it may be possible to have two AMF network nodes 16*h* and 16*k* in the system, which does not affect the working of the solution.

In some embodiments, the network (e.g., a network node 16) may send a trigger message to the terminal device to establish two (multiple) PDU sessions 70 for redundancy from the two UEs 22. Such a trigger message may be sent when the first PDU session 70*a* is established, or before (on another PDU session, or as part of the configuration). The trigger message may be sent from the SMF, AMF, PCF, TSCTSF or other network node 16 within or outside of the 3GPP network.

Capability Indication

In some embodiments, the UE 22 (e.g., comprised in a terminal device) may indicate whether it has the capability to perform the replication and elimination functionality. The capability indication may also include which specific mechanism is supported for replication and elimination. The capability indication may also indicate whether the single UE 22 dual connectivity based redundancy is supported, and whether the multiple UE 22 based redundancy is supported. The capability indication may be provided in advance, e.g., when the UE 22 (e.g., comprised in a terminal device) attaches to the network. The capability indication may also be provided when the network sends a request to establish redundancy, and in the response the UE 22 (e.g., comprised in a terminal device) may indicate whether it has or it does not have the capability.

Similarly, in some embodiments, the UPF network node 16*f* may also indicate its capability to perform replication or elimination function. Alternatively, the UPF network node 16*f* capability may be considered during the UPF selection process, and an SMF network node 16*d* may select a UPF network node 16*f* which has support for the R/E function. The UPF network node 16*f* replication and elimination capabilities may be pre-configured into the UPF selection mechanism.

The following is a nonlimiting list of example embodiments:

Embodiment A1. A network node configured to communicate with a user equipment (UE), the network node configured to, and/or comprising a radio interface and/or comprising processing circuitry configured to:

optionally, obtain information about communication supporting one or more of packet replication and redundant transmission over a network for a traffic associated with the UE; and establish a first protocol data unit (PDU) session and a second PDU session that supports the one or more of the packet replication and the redundant transmission between the UE and a same user plane function (UPF) network node.

Embodiment A2. The network node of Embodiment A1, where the network node and/or the radio interface and/or the processing circuitry is configured to:

select the same UPF network node for both the first and second PDU sessions to support the one or more of the packet replication and the redundant transmission between the UE and the same UPF network node.

Embodiment A3. The network node of any one of Embodiments A1 and A2, wherein the selection of the same UPF network node to use for both the first and second PDU session is based at least in part on one or more of: the obtained information, a data network name (DNN), a single-slice selection assistance information (S-NSSAI), an identifier of a pair/set of redundant PDU sessions comprising the first and second PDU sessions and an identifier of the UE.

Embodiment A4. The network node of any one of Embodiments A1-A3, wherein the network node and/or radio interface and/or processing circuitry is configured to obtain, derive and/or receive: (i) an identifier of a pair/set of redundant PDU sessions comprising the first and second PDU sessions; and (ii) an identifier of the UE.

Embodiment A5. The network node of any one of Embodiments A1-A4, wherein the first and second PDU sessions are comprised in a pair/set of redundant PDU sessions associated with the UE and the traffic; and an identifier of the pair/set of redundant PDU sessions is mapped an identifier of the UE.

Embodiment A6. The network node of any one of Embodiments A1-A5, wherein the network node and/or radio interface and/or processing circuitry is configured to store an indication of the UPF network node selected for the first PDU session in a database and obtain the stored indication of the UPF network node to use for the second PDU session.

Embodiment A7. The network node of any one of Embodiments A1-A6, wherein the network node and/or radio interface and/or processing circuitry is configured to prior to the establishment of one of the first and second PDU sessions, determine whether the UPF network node has already been selected for the establishment of another one of the first and second PDU sessions.

Embodiment A8. The network node of any one of Embodiments A1-A7, wherein the network node and/or radio interface and/or processing circuitry is configured to obtain the information by being configured to send an indication to at least one of the UE and/or the UPF, the indication instructing the UE and/or the UPF to one or more of:

replicate of a first redundant packet for the first PDU session to produce a second redundant packet for the second PDU session;

eliminate of one of a first redundant packet on the first PDU session and a second redundant packet on the second PDU session that are received from the same UPF network node; and perform the redundant transmission between the UE and the same UPF network node.

Embodiment A9. The network node of any one of Embodiments A1-A8, wherein the network node and/or radio interface and/or processing circuitry is configured to as a result of obtaining/sending the information, receiving an acknowledgement from the UE and/or the UPF indicating whether a replication and elimination function has been set up in accordance with the obtained information.

Embodiment A10. The network node of any one of Embodiments A1-A9, wherein for downlink data send the information to the UE prior to the same UPF network node receiving the information and/or sending an acknowledgement and for uplink data send the information to the UE after the same UPF network node receives the information and/or sends an acknowledgement.

Embodiment A11. The network node of any one of Embodiments A1-A9, wherein one or more of:

- the obtained information that is sent to the UE and/or the UPF network node comprises indications and/or parameters indicating and/or identifying one or more of: a replication and elimination protocol to be used at the UE/UPF, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and
- a granularity of the replication and elimination is one of per PDU session, per Quality-of-service (QOS) flow, and per traffic flow.

Embodiment A12. The network node of any one of Embodiments A1-A11, wherein at least one of the first and second PDU sessions comprises multiple instances of a replication and elimination function to support a per QoS or per traffic flow granularity.

Embodiment A13. The network node of any one of Embodiments A1-A12, wherein the network node and/or radio interface and/or processing circuitry is configured to send and/or receive information indicating to one or more of:

- modify at least one parameter associated with the packet replication/elimination; and
- release a replication and elimination function associated with the first and second PDU sessions.

Embodiment A14. The network node of any one of Embodiments A1-A13, wherein the network node and/or radio interface and/or processing circuitry is configured to send information to the UE identifying the same UPF network node to initiate the establishment of the first and second PDU sessions.

Embodiment A15. The network node of any one of Embodiments A1-A14, wherein the network node and/or radio interface and/or processing circuitry is configured to request and/or receive information indicating a UE capability to support the packet replication/redundant transmission between the UE and the same UPF network node.

Embodiment A16. The network node of any one of Embodiments A1-A15, wherein one of more of:

- the UE is a dual UE device comprising a first UE and a second UE;
- the network node comprises one or more a session management functions (SMFs); and
- the network node comprises a Time Sensitive Communication and Time Synchronization function (TSCTSF).

Embodiment B1. A method implemented in a network node that is configured to communicate with a user equipment (UE), the method comprising:

- optionally, obtaining information about communication supporting one or more of packet replication and redundant transmission over a network for a traffic associated with the UE; and
- establishing at least one of a first protocol data unit (PDU) session and a second PDU session that supports the one or more of the packet replication and the redundant transmission between the UE and a same user plane function (UPF) network node.

Embodiment B2. The method of Embodiment B1, further comprising:

- selecting the same UPF network node for both the first and second PDU sessions to support the one or more of the packet replication and the redundant transmission between the UE and the same UPF network node.

Embodiment B3. The method of any one of Embodiments B1 and B2, wherein the selection of the same UPF network node to use for both the first and second PDU session is based at least in part on one or more of: the obtained information, a data network name (DNN), a single-slice selection assistance information (S-NSSAI), an identifier of a pair/set of redundant PDU sessions comprising the first and second PDU sessions and an identifier of the UE.

Embodiment B4. The method of any one of Embodiments B1-B3, further comprising obtaining, deriving and/or receiving: (i) an identifier of a pair/set of redundant PDU sessions comprising the first and second PDU sessions; and (ii) an identifier of the UE.

Embodiment B5. The method of any one of Embodiments B1-B4, wherein the first and second PDU sessions are comprised in a pair/set of redundant PDU sessions associated with the UE and the traffic; and an identifier of the pair/set of redundant PDU sessions is mapped an identifier of the UE.

Embodiment B6. The method of any one of Embodiments B1-B5, further comprising storing an indication of the UPF network node selected for the first PDU session in a database and obtaining the stored indication of the UPF network node to use for the second PDU session.

Embodiment B7. The method of any one of Embodiments B1-B6, further comprising prior to the establishment of one of the first and second PDU sessions, determining whether the UPF network node has already been selected for the establishment of another one of the first and second PDU sessions.

Embodiment B8. The method of any one of Embodiments B1-B7, further comprising obtaining the information to send an indication to at least one of the UE and/or the UPF, the indication instructing the UE and/or the UPF to one or more of:

- replicate of a first redundant packet for the first PDU session to produce a second redundant packet for the second PDU session;
- eliminate of one of a first redundant packet on the first PDU session and a second redundant packet on the second PDU session that are received from the same UPF network node; and
- perform the redundant transmission between the UE and the same UPF network node.

Embodiment B9. The method of any one of Embodiments B1-B8, further comprising as a result of obtaining/sending the information, receive an acknowledgement from the UE and/or the UPF indicating whether a replication and elimination function has been set up in accordance with the obtained information.

Embodiment B10. The method of any one of Embodiments B1-B9, wherein for downlink data send the information to the UE prior to the same UPF network node receiving the information and/or sending an acknowledgement and for uplink data send the information to the UE after the same UPF network node receives the information and/or sends an acknowledgement.

Embodiment B11. The method of any one of Embodiments B1-B10, wherein one or more of:

the obtained information that is sent to the UE and/or the UPF network node comprises indications and/or parameters indicating and/or identifying one or more of: a replication and elimination protocol to be used at the UE/UPF, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and a granularity of the replication and elimination is one of per PDU session, per Quality-of-service (QOS) flow, and per traffic flow.

Embodiment B12. The network node of any one of Embodiments B1-B11, wherein at least one of the first and second PDU sessions comprises multiple instances of a replication and elimination function to support a per QoS or per traffic flow granularity.

Embodiment B13. The network node of any one of Embodiments B1-B12, wherein the network node and/or radio interface and/or processing circuitry is configured to send and/or receive information indicating to one or more of:

modify at least one parameter associated with the packet replication/elimination; and release a replication and elimination function associated with the first and second PDU sessions.

Embodiment B14. The network node of any one of Embodiments B1-B13, wherein the network node and/or radio interface and/or processing circuitry is configured to send information to the UE identifying the same UPF network node to initiate the establishment of the first and second PDU sessions.

Embodiment B15. The network node of any one of Embodiments B1-B14, wherein the network node and/or radio interface and/or processing circuitry is configured to request and/or receive information indicating a UE capability to support the packet replication/redundant transmission between the UE and the same UPF network node.

Embodiment B16. The network node of any one of Embodiments B1-B15, wherein one of more of:

the UE is a dual UE device comprising a first UE and a second UE;

the network node comprises a session management function (SMF); and the network node comprises a Time Sensitive Communication and Time Synchronization function (TSCTSF).

Embodiment C1. A user equipment (UE) configured to communicate with a network node, the UE configured to, and/or comprising a radio interface and/or processing circuitry configured to:

optionally, obtain information about communication supporting one or more of packet replication and redundant transmission for a traffic; and establish a first protocol data unit (PDU) session and a second PDU session that supports the one or more of the packet replication and the redundant transmission between the UE and a same user plane function (UPF) network node.

Embodiment C2. The UE of Embodiment C1, wherein the UE and/or radio interface and/or processing circuitry is configured to:

transmit a first redundant packet on the first PDU session to the same UPF network node;

replicate the first redundant packet to produce a second redundant packet; and transmit the second redundant packet on the second PDU session to the same UPF network node, the second redundant packet being the replication of first redundant packet.

Embodiment C3. The UE of any one of Embodiments C1 and C2, wherein the UE and/or radio interface and/or processing circuitry is configured to: receive a first redundant packet on the first PDU session from the same UPF network node;

receive a second redundant packet on the second PDU session from the same UPF network node; and eliminate one of the first and second redundant packets received from the same UPF network node.

Embodiment C4. The UE of any one of Embodiments C1-C3, wherein based at least in part on the obtained information, the same UPF network node is selected for both the first and second PDU sessions to support the packet replication/redundant transmission between the UE and the same UPF network node.

Embodiment C5. The UE of any one of Embodiments C1-C4, wherein a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE.

Embodiment C6. The UE of any one of Embodiments C1-C5, wherein the UE and/or radio interface and/or processing circuitry is configured to obtain, derive and/or receive from a core network node an identifier of a pair/set of redundant PDU sessions comprising the first and second PDU sessions.

Embodiment C7. The UE of any one of Embodiments C1-C6, wherein the first and second PDU sessions are comprised in a pair/set of redundant PDU sessions associated with the UE and the traffic; and an identifier of the pair/set of redundant PDU sessions is mapped an identifier of the UE.

Embodiment C8. The UE of any one of Embodiments C1-C7, wherein the obtained information comprises an indication received from a core network node instructing the UE to perform the one or more of a packet replication for uplink data associated with the traffic, a packet elimination for downlink data associated with the traffic and the redundant transmission between the UE and the same UPF network node.

Embodiment C9. The UE of any one of Embodiments C1-C8, wherein the UE and/or radio interface and/or processing circuitry is configured to as a result of obtaining the information and/or establishing the first and second PDU sessions, sending an acknowledgement to a core network node, the acknowledgement indicating whether a replication and elimination function has been set up in accordance with the obtained information.

Embodiment C10. The UE of any one of Embodiments C1-C9, wherein the UE and/or radio interface and/or processing circuitry is configured to obtain the information by being configured to:

for downlink data receive the information at the UE prior to the same UPF receiving the information and/or sending an acknowledgement and for uplink data receive the information at the UE and/or sending an acknowledgement after the same UPF receiving the information.

Embodiment C11. The UE of any one of Embodiments C1-C10, wherein one or more of:

the obtained information comprises indications and/or parameters indicating and/or identifying one or more of: a replication and elimination protocol to be used at the UE, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and a granularity of the replication and elimination is one of per PDU session, per Quality-of-service (QOS) flow, and per traffic flow.

Embodiment C12. The UE of any one of Embodiments C1-C11, wherein at least one of the first and second PDU sessions comprises multiple instances of a replication and elimination function to support a per QoS or per traffic flow granularity.

Embodiment C13. The UE of any one of Embodiments C1-C12, wherein the UE and/or radio interface and/or processing circuitry is configured to send and/or receive information indicating to one or more of:

modify at least one parameter associated with the packet replication/elimination; and release a replication and elimination function associated with the first and second PDU sessions.

Embodiment C14. The UE of any one of Embodiments C1-C13, wherein the UE and/or radio interface and/or processing circuitry is configured to determine to establish the first and second PDU sessions to support the packet replication/redundant transmission between the UE and the same UPF network node when the information is obtained from two different session management function (SMF) network nodes and/or at least one parameter comprised in the information are a same.

Embodiment C15. The UE of any one of Embodiments C1-C14, wherein the UE is a dual UE device comprising a first UE and a second UE.

Embodiment C16. The UE of any one of Embodiments C1-C15, wherein the UE and/or radio interface and/or processing circuitry is configured to receive information identifying the same UPF network node to initiate the establishment of the first and second PDU sessions.

Embodiment C17. The UE of any one of Embodiments C1-C16, wherein the UE and/or radio interface and/or processing circuitry is configured to send information indicating a UE capability to support the packet replication/redundant transmission between the UE and the same UPF network node.

Embodiment D1. A method implemented in a user equipment (UE) that is configured to communicate with a network node, the method comprising:

optionally, obtaining information about communication supporting one or more of packet replication and redundant transmission for a traffic; and establishing a first protocol data unit (PDU) session and a second PDU session that supports the one or more of the packet replication and the redundant transmission between the UE and a same user plane function (UPF) network node.

Embodiment D2. The method of Embodiment D1, further comprising:

transmitting a first redundant packet on the first PDU session to the same UPF network node;

replicating the first redundant packet to produce a second redundant packet; and transmitting the second redundant packet on the second PDU session to the same UPF network node, the second redundant packet being the replication of first redundant packet.

Embodiment D3. The method of any one of Embodiments D1 and D2, further comprising:

receiving a first redundant packet on the first PDU session from the same UPF network node;

receiving a second redundant packet on the second PDU session from the same UPF network node; and eliminating one of the first and second redundant packets received from the same UPF network node.

Embodiment D4. The method of any one of Embodiments D1-D3, wherein based at least in part on the obtained information, the same UPF network node is selected for both the first and second PDU sessions to support the packet replication/redundant transmission between the UE and the same UPF network node.

Embodiment D5. The method of any one of Embodiments D1-D4, wherein a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE.

Embodiment D6. The method of any one of Embodiments D1-D5, further comprising obtaining, deriving and/or receiving from a core network node an identifier of a pair/set of redundant PDU sessions comprising the first and second PDU sessions.

Embodiment D7. The method of any one of Embodiments D1-D6, wherein the first and second PDU sessions are comprised in a pair/set of redundant PDU sessions associated with the UE and the traffic; and an identifier of the pair/set of redundant PDU sessions is mapped an identifier of the UE.

Embodiment D8. The method of any one of Embodiments D1-D7, wherein the obtained information comprises an indication received from a core network node instructing the UE to perform the one or more of a packet replication for uplink data associated with the traffic, a packet elimination for downlink data associated with the traffic and the redundant transmission between the UE and the same UPF network node.

Embodiment D9. The method of any one of Embodiments D1-D8, further comprising as a result of obtaining the information and/or establishing the first and second PDU sessions, sending an acknowledgement to a core network node, the acknowledgement indicating whether a replication and elimination function has been set up in accordance with the obtained information.

Embodiment D10. The method of any one of Embodiments D1-D9, wherein the obtaining the information comprises:

for downlink data receiving the information at the UE and/or sending an acknowledgement prior to the UPF receiving the information and for uplink data receiving the information at the UE and/or sending an acknowledgement after the UPF receiving the information.

Embodiment D11. The method of any one of Embodiments D1-D10, wherein one or more of:

the obtained information comprises indications and/or parameters indicating and/or identifying one or more of: a replication and elimination protocol to be used at the UE, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and the granularity of the replication and elimination is one of per PDU session, per Quality-of-service (QOS) flow, and per traffic flow.

Embodiment D12. The method of any one of Embodiments D1-D11, wherein at least one of the first and second PDU sessions comprises multiple instances of a replication and elimination function to support a per QoS or per traffic flow granularity.

Embodiment D13. The method of any one of Embodiments D1-D12, further comprising sending and/or receiving information indicating to one or more of:

modify at least one parameter associated with the packet replication/elimination; and release a replication and elimination function associated with the first and second PDU sessions.

Embodiment D14. The method of any one of Embodiments D1-D13, further comprising determining to establish the first and second PDU sessions to support the packet replication/redundant transmission between the UE and the same UPF network node when the information is obtained from two different session management function (SMF) network nodes and/or at least one parameter comprised in the information are a same.

Embodiment D15. The method of any one of Embodiments D1-D14, wherein the UE is a dual UE device comprising a first UE and a second UE.

Embodiment D16. The method of any one of Embodiments D1-D15, further comprising receiving information identifying the same UPF network node to initiate the establishment of the first and second PDU sessions.

Embodiment D17. The method of any one of Embodiments D1-D16, further comprising sending information indicating a UE capability to support the packet replication/redundant transmission between the UE and the same UPF network node.

Embodiment E1. A network node configured to communicate with a user equipment (UE), the network node configured to, and/or comprising a radio interface and/or comprising processing circuitry configured to:

optionally, obtain information about communication supporting one or more of packet replication and redundant transmission over a network for a traffic associated with the UE; and establish at least one of a first protocol data unit (PDU) session and a second PDU session that supports the one or more of the packet replication and the redundant transmission between the UE and a same user plane function (UPF), the same UPF being comprised in the network node.

Embodiment E2. The network node of Embodiment E1, wherein the network node and/or radio interface and/or processing circuitry is configured to:

transmit a first redundant packet on the first PDU session to the UE;

replicate the first redundant packet to produce a second redundant packet; and transmit the second redundant packet on the second PDU session to the UE, the second redundant packet being the replication of first redundant packet.

Embodiment E3. The network node of any one of Embodiments E1 and E2, wherein the network node and/or radio interface and/or processing circuitry is configured to:

receive a first redundant packet on the first PDU session from the UE;

receive a second redundant packet on the second PDU session from the UE; and eliminate one of the first and second redundant packets received from the UE.

Embodiment E4. The network node of any one of Embodiments E1-E3, wherein based at least in part on the obtained information, the same UPF network node is selected for both the first and second PDU sessions to support the packet replication/redundant transmission between the UE and the same UPF network node.

Embodiment E5. The network node of any one of Embodiments E1-E4, wherein a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE.

Embodiment E6. The network node of any one of Embodiments E1-E5, wherein the network node and/or radio interface and/or processing circuitry is configured to obtain, derive and/or receive from a core network node an identifier of a pair/set of redundant PDU sessions comprising the first and second PDU sessions.

Embodiment E7. The network node of any one of Embodiments E1-E6, wherein the first and second PDU sessions are comprised in a pair/set of redundant PDU sessions associated with the UE and the traffic; and an identifier of the pair/set of redundant PDU sessions is mapped an identifier of the UE.

Embodiment E8. The network node of any one of Embodiments E1-E7, wherein the obtained information comprises an indication received from a core network node instructing the network node to perform the one or more of a packet elimination for uplink data associated with the traffic, a packet replication for downlink data associated with the traffic and the redundant transmission between the UE and the same UPF network node.

Embodiment E9. The network node of any one of Embodiments E1-E8, wherein the network node and/or radio interface and/or processing circuitry is configured to as a result of obtaining the information and/or establishing the first and second PDU sessions, send an acknowledgement to a core network node, the acknowledgement indicating whether a replication and elimination function has been set up in accordance with the obtained information.

Embodiment E10. The network node of any one of Embodiments E1-E9, wherein the network node and/or radio interface and/or processing circuitry is configured to obtain the information by being configured to:

for downlink data the information is received at the UE prior to the UPF receiving the information and/or sending an acknowledgement and for uplink data the information at the UE after the UPF receives the information and/or sends an acknowledgement.

Embodiment E11. The network node of any one of Embodiments E1-E10, wherein one or more of:

the obtained information comprises indications and/or parameters indicating and/or identifying one or more of: a replication and elimination protocol to be used at the UE, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and a granularity of the replication and elimination is one of per PDU session, per Quality-of-service (QOS) flow, and per traffic flow.

Embodiment E12. The network node of any one of Embodiments E1-E11, wherein at least one of the first and second PDU sessions comprises multiple instances of a replication and elimination function to support a per QoS or per traffic flow granularity.

Embodiment E13. The network node of any one of Embodiments E1-E12, wherein the network node and/or radio interface and/or processing circuitry is configured to send and/or receive information indicating to one or more of:

modify at least one parameter associated with the packet replication/elimination; and release a replication and elimination function associated with the first and second PDU sessions.

Embodiment E14. The network node of any one of Embodiments E1-E13, wherein the network node and/or radio interface and/or processing circuitry is configured to determine to establish the first and second PDU sessions to support the packet replication/redundant transmission between the UE and the same UPF network node when the information is obtained from two different session management function (SMF) network nodes and/or at least one parameter comprised in the information are a same.

Embodiment E15. The network node of any one of Embodiments E1-E14, wherein the UE is a dual UE device comprising a first UE and a second UE.

Embodiment E16. The network node of any one of Embodiments E1-E15, wherein the network node and/or radio interface and/or processing circuitry is configured to send information identifying the UPF network node to the UE to initiate the establishment of the first and second PDU sessions to support the packet replication/redundant transmission between the UE and the same UPF network node.

Embodiment E17. The network node of any one of Embodiments E1-E16, wherein the network node and/or radio interface and/or processing circuitry is configured to send information indicating a UPF capability to support the packet replication/redundant transmission between the UE and the same UPF network node.

Embodiment F1. A method implemented in a network node that is configured to communicate with a user equipment (UE), the method comprising optionally, obtaining information about communication supporting one or more of packet replication and redundant transmission over a network for a traffic associated with the UE; and establishing at least one of a first protocol data unit (PDU) session and a second PDU session that supports the one or more of the packet replication and the redundant transmission between the UE and a same user plane function (UPF), the same UPF being comprised in the network node.

Embodiment F2. The network node of Embodiment F1, wherein the network node and/or radio interface and/or processing circuitry is configured to:

transmit a first redundant packet on the first PDU session to the UE;

replicate the first redundant packet to produce a second redundant packet; and transmit the second redundant packet on the second PDU session to the UE, the second redundant packet being the replication of first redundant packet.

Embodiment F3. The network node of any one of Embodiments F1 and F2, wherein the network node and/or radio interface and/or processing circuitry is configured to:

receive a first redundant packet on the first PDU session from the UE;

receive a second redundant packet on the second PDU session from the UE; and eliminate one of the first and second redundant packets received from the UE.

Embodiment F4. The network node of any one of Embodiments F1-F3, wherein based at least in part on the obtained information, the same UPF network node is selected for both the first and second PDU sessions to support the packet replication/redundant transmission between the UE and the same UPF network node.

Embodiment F5. The network node of any one of Embodiments F1-F4, wherein a selection of the same UPF network node to use for both the first and second PDU sessions is based at least in part on one or more of: a data network name (DNN), a single-slice selection assistance information (S-NSSAI), an identifier of a pair/set of redundant PDU sessions comprising the first and second PDU sessions and an identifier of the UE.

Embodiment F6. The network node of any one of Embodiments F1-F5, wherein the network node and/or radio interface and/or processing circuitry is configured to obtain, derive and/or receive from a core network node an identifier of a pair/set of redundant PDU sessions comprising the first and second PDU sessions.

Embodiment F7. The network node of any one of Embodiments F1-F6, wherein the first and second PDU sessions are comprised in a pair/set of redundant PDU sessions associated with the UE and the traffic; and an identifier of the pair/set of redundant PDU sessions is mapped an identifier of the UE.

Embodiment F8. The network node of any one of Embodiments F1-F7, wherein the obtained information comprises an indication received from a core network node instructing the network node to perform the one or more of a packet elimination for uplink data associated with the traffic, a packet replication for downlink data associated with the traffic and the redundant transmission between the UE and the same UPF network node.

Embodiment F9. The network node of any one of Embodiments F1-F8, wherein the network node and/or radio interface and/or processing circuitry is configured to as a result of obtaining the information and/or establishing the first and second PDU sessions, send an acknowledgement to a core network node, the acknowledgement indicating whether a replication and elimination function has been set up in accordance with the obtained information.

Embodiment F10. The network node of any one of Embodiments F1-F9, wherein the network node and/or radio interface and/or processing circuitry is configured to obtain the information by being configured to:

for downlink data the information is received at the UE prior to the UPF receiving the information and/or sending an acknowledgement and for uplink data the information at the UE after the UPF receives the information and/or sends an acknowledgement.

Embodiment F11. The network node of any one of Embodiments F1-F10, wherein one or more of:

the obtained information comprises indications and/or parameters indicating and/or identifying one or more of: a replication and elimination protocol to be used at the UE, a header field in at least one of the first and second replication packets to be used for sequence numbering, whether a flow identifier is to be used for the packets, a header field in at least one of the first and second replication packets to use as the flow identifier, a granularity of the replication and elimination, a QoS flow identifier identifying which QoS flow to apply the replication and elimination, which packets to apply the replication and elimination, a filtering criteria, whether to perform re-ordering, a time interval to wait for a missing redundant packet to arrive, and a traffic type to apply the replication and elimination; and a granularity of the replication and elimination is one of per PDU session, per Quality-of-service (QOS) flow, and per traffic flow.

Embodiment F12. The network node of any one of Embodiments F1-F11, wherein at least one of the first and second PDU sessions comprises multiple instances of a replication and elimination function to support a per QoS or per traffic flow granularity.

Embodiment F13. The network node of any one of Embodiments F1-F12, wherein the network node and/or radio interface and/or processing circuitry is configured to send and/or receive information indicating to one or more of:

modify at least one parameter associated with the packet replication/elimination; and release a replication and elimination function associated with the first and Embodiment F14. The network node of any one of Embodiments F1-F13, wherein the network node and/or radio interface and/or processing circuitry is configured to determine to establish the first and second PDU sessions to support the packet replication/redundant transmission between the UE and the same UPF network node when the information is obtained from two different session management function (SMF) network nodes and/or at least one parameter comprised in the information are a same.

Embodiment F15. The network node of any one of Embodiments F1-F14, wherein the UE is a dual UE device comprising a first UE and a second UE.

Embodiment F16. The network node of any one of Embodiments F1-F15, wherein the network node and/or radio interface and/or processing circuitry is configured to send information identifying the UPF network node to the UE to initiate the establishment of the first and second PDU sessions to support the packet replication/redundant transmission between the UE and the same UPF network node.

Embodiment F17. The network node of any one of Embodiments F1-F16, wherein the network node and/or radio interface and/or processing circuitry is configured to send information indicating a UPF capability to support the packet replication/redundant transmission between the UE and the same UPF network node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| AF | Application Function |
| AMF | Access and Mobility Function |
| AS | Application Server |
| BAT | Burst Arrival Time |
| CN | Core Network |
| CNC | Central Network Controller |
| CUC | Central User Controller |
| DetNet | Deterministic Networking |
| DSCP | Differentiated Services Code Point |
| DNN | Data Network Name |
| DS-TT | Device Side TSN Translator |
| EPC | Evolved Packet Core |
| GPSI | Generic Public Subscription Identifier |
| IGP | Interior Gateway Protocol |
| LLDP | Link Layer Discovery Protocol |
| MAC | Medium Access Control |
| ND | Neighbor Discovery |
| NEF | Network Exposure Function |
| NRF | Network Resource Function |
| NW-TT | Network Side TSN Translator |
| PEI | Permanent Equipment Identifier |
| PDB | Packet Delay Budget |
| PCF | Policy Control Function |
| PSA | PDU session Anchor |
| QFI | QoS Flow Identifier |
| RAN | Radio Access Network |
| SDN | Software Defined Network |
| SMF | Session Management Function |

-continued

| Abbreviation | Explanation |
|---|---|
| S-NSSAI | Single Network Slice Selection Assistance Information |
| SSC | Session and Service Continuity |
| SUPI | Subscription Permanent Identifier |
| SW | Switch |
| TSC | Time Sensitive Communication |
| TSCAI | Time Sensitive Communication Assistance Information |
| TSCTSF | Time Sensitive Communication and Time Synchronization Function |
| TSN | Time-Sensitive Networking |
| UDM | User Data Management |
| UE | User Equipment |
| UPF | User Plane Function |
| VLAN | Virtual Local Area Network |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment, UE, configured to communicate with at least a network node, the UE comprising a radio interface and processing circuitry in communication with the processing circuitry:

the radio interface being configured to:

receive, from the network node, an indication indicating the UE to establish a first protocol data unit, PDU, session and a second PDU session that support one or more packet replication and redundant transmissions between the UE and a same UPF network node, the same UPF network node being selected by the network node based on one or more parameters; and the processing circuitry being configured to:

establish, based on the received indication, the first and second PDU sessions that support the one or more packet replication and redundant transmissions between the UE and the same UPF network node, wherein the first PDU session and the second PDU session are both established between the same UE and the same UPF network node, and the one or more packet replication and redundant transmissions comprise duplicate copies of a same packet that are transmitted concurrently over the first PDU session and the second PDU session for redundancy between the UE and the same UPF network node.

2. The UE of claim 1, wherein the one or more parameters includes at least one of:

information about communication supporting the one or more packet replication and redundant transmissions over a network for a traffic associated with the UE;

a data network name, DNN;

a single-network slice selection assistance information, S-NSSAI; and a first identifier of the UE.

3. The UE of claim 1, wherein the received indication further triggers one or more of:

the processing circuitry to:

replicate of a first redundant packet for the first PDU session to produce a second redundant packet for the second PDU session;

eliminate of one of a first redundant packet on the first PDU session and a second redundant packet on the second PDU session that is received from the same UPF network node; and the radio interface to:

perform one or more redundant transmissions between the UE and the same UPF network node.

4. The UE of claim 1, wherein the radio interface is further configured to:

transmit, to the network node, an acknowledgement indicating at least one of the indication has been successfully received and whether a replication and elimination function has been set up.

5. The UE of claim 1, wherein, when the same UPF network node is selected for the first PDU session, information about the same UPF network node being selected for the first PDU session is used for a selection of the same UPF network node for the second PDU session.

6. The UE of claim 5, wherein the information about the same UPF network node being selected includes a second identifier of the first and second PDU sessions.

7. The UE of claim 6, wherein whether the same UPF network node has already been selected for the first and second PDU sessions is based at least in part on the second identifier, the same UPF network node being selected based on whether the same UPF network node has already been selected.

8. The UE of claim 6, wherein the second identifier includes at least a pair identifier associated with the first and second PDU sessions and a UE identifier mapped to the pair identifier.

9. The UE of claim 6, wherein the second identifier is included in the one or more parameters.

10. The UE of claim 1, wherein the UE is a dual UE device comprising a first UE and a second UE, the first PDU session supports one or more packet replication and redundant transmissions between the first UE and the same UPF network node, and the second PDU session supports the one or more packet replication and redundant transmissions between the second UE and the same UPF network node.

11. The UE of claim 1, wherein the radio interface is further configured to:

transmit capability information indicating a UE capability to support the one or more packet replication and redundant transmissions between the UE and the same UPF network node.

12. A method in a network node configured to communicate with a user equipment, UE, the method comprising:

selecting a same user plane function, UPF, network node for a first protocol data unit, PDU, session and a second PDU session that support one or more packet replication and redundant transmissions between the UE and the same UPF network node, the same UPF network node being selected based on one or more parameters; and transmitting an indication to at least one of the UE and the same UPF network node, the transmitted indication indicating at least one of the UE and the same UPF network node to establish the first and second PDU sessions using the selected same UPF network node, wherein the first PDU session and the second PDU session are both established between the same UE and the same UPF network node, and the one or more packet replication and redundant transmissions comprise duplicate copies of a same packet that are transmitted concurrently over the first PDU session and the second PDU session for redundancy between the UE and the same UPF network node.

13. The method of claim 12, wherein the one or more parameters includes at least one of:

information about communication supporting the one or more packet replication and redundant transmissions over a network for a traffic associated with the UE;

a data network name, DNN;

a single-network slice selection assistance information, S-NSSAI; and a first identifier of the UE.

14. The method of claim 12, wherein the transmitted indication further triggers the at least one of the UE and the same UPF to one or more of:

replicate of a first redundant packet for the first PDU session to produce a second redundant packet for the second PDU session;

eliminate of one of a first redundant packet on the first PDU session and a second redundant packet on the second PDU session that is received from the same UPF network node; and perform one or more redundant transmissions between the UE and the same UPF network node.

15. The method of claim 12, wherein the method further includes:

receiving an acknowledgement from at least one of the UE and the same UPF indicating at least one of the indication has been successfully received and whether a replication and elimination function has been set up.

16. The method of claim 12, wherein the selection of the same UPF network node for the first PDU session and the second PDU session further includes:

when the same UPF network node is selected for the first PDU session:

storing information about the same UPF being selected for the first PDU session;

retrieving the information for a selection of the same UPF network node for the second PDU session.

17. The method of claim 16, wherein the method further includes:

storing the information about the same UPF being selected and a second identifier of the first and second PDU sessions.

18. The method of claim 17, wherein the method further includes:

determining whether the same UPF has already been selected for the first and second PDU sessions based at least in part on the second identifier, the selection of the same UPF network node being based on whether the same UPF has already been selected.

19. The method of claim 17, wherein the second identifier includes at least a pair identifier associated with the first and second PDU sessions and a UE identifier mapped to the pair identifier.

20. The method of claim 12, wherein the network node comprises one of more of:

a session management function, SMF; and a time sensitive communication and time synchronization function, TSCTSF.

* * * * *